(12) United States Patent
Ueno

(10) Patent No.: US 7,980,364 B2
(45) Date of Patent: Jul. 19, 2011

(54) BATTERY FORKLIFT DRIVE UNIT

(75) Inventor: Kazunori Ueno, Oyama (JP)

(73) Assignee: Komatsu Utility Co., Ltd., Tokyo (JP)

(*) Notice: Subject to any disclaimer, the term of this patent is extended or adjusted under 35 U.S.C. 154(b) by 195 days.

(21) Appl. No.: 12/294,417

(22) PCT Filed: Mar. 22, 2007

(86) PCT No.: PCT/JP2007/056762
§ 371 (c)(1),
(2), (4) Date: Oct. 16, 2008

(87) PCT Pub. No.: WO2007/119577
PCT Pub. Date: Oct. 25, 2007

(65) Prior Publication Data
US 2009/0277727 A1 Nov. 12, 2009

(30) Foreign Application Priority Data

Mar. 24, 2006 (JP) ................................ 2006-083631

(51) Int. Cl.
*B60T 1/06* (2006.01)
(52) U.S. Cl. ..................................... 188/71.5; 188/72.9
(58) Field of Classification Search ................ 188/71.5, 188/72.7–72.9, 170; 192/70.12, 70.19–70.24, 192/70.29, 70.3
See application file for complete search history.

(56) References Cited

U.S. PATENT DOCUMENTS

| 3,132,724 A | * | 5/1964 | Ansteth ........................ 188/71.5 |
| 3,237,724 A | * | 3/1966 | Kershner et al. ............. 188/71.5 |
| 5,090,501 A | * | 2/1992 | McNulty ....................... 180/305 |
| 5,147,255 A |   | 9/1992 | Strehler et al. |
| 5,174,419 A | * | 12/1992 | Strehler et al. ............... 188/72.6 |

FOREIGN PATENT DOCUMENTS

| GB | 1 499 995 A | 2/1978 |
| JP | 51-72871 A | 6/1976 |
| JP | 2003-247573 A | 9/2003 |
| JP | 2005-029117 A | 2/2005 |

OTHER PUBLICATIONS

International Preliminary Report on Patentability, Chapter I of the Patent Cooperation Treaty, undated, for PCT/JP2007/056762. 6 sheets.
English Language International Search Report dated May 15, 2007 issued in parent Appln. No. PCT/JP2007/056762.

* cited by examiner

*Primary Examiner* — Christopher P Schwartz
(74) *Attorney, Agent, or Firm* — Holtz, Holtz, Goodman & Chick, PC

(57) ABSTRACT

The invention is aimed at providing a battery forklift drive unit which makes a large space unnecessary for disposing brakes in the vicinities of drive units, thereby to achieve making the vicinities of drive units compact in a battery forklift. To this end, a second gear disposed in a drive case of the drive unit is formed inside with a space in which a wet type brake section is disposed and the wet type brake section comprises an inner disk whose entire inner periphery is attached to the second gear, an outer disk which lies opposite to the inner disk and whose entire outer periphery is attached to a side of the drive case, and a pressure plate for pressing together the inner and outer disks lying opposite to each other.

8 Claims, 19 Drawing Sheets

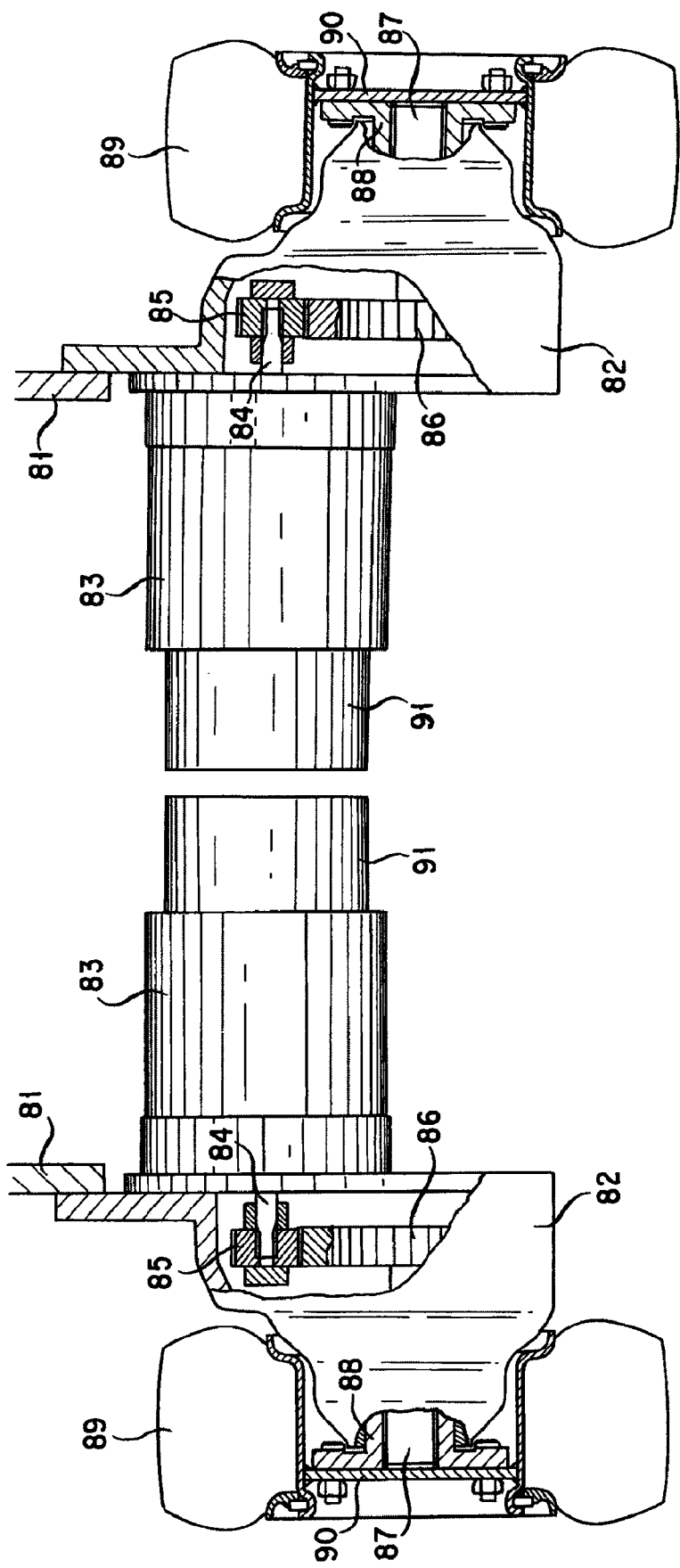

BATTERY FORKLIFT DRIVE UNIT

This application is a U.S. National Phase Application under 35 USC 371 of International Application PCT/JP2007/056762 filed Mar. 22, 2007.

TECHNICAL FIELD

The present invention relates to a battery forklift drive unit and, more specifically, to an improvement in battery forklift drive units in which a brake is disposed inside of a drive unit, thereby to achieve making the vicinities of drive units compact in a battery forklift.

BACKGROUND ART

So far, a pair of drive units in a battery forklift as shown in FIG. 19 include a left and a right drive case 82 and 82, respectively, which are fastened to the body 81 of a forklift, the left and right drive cases 82 and 82 having a pair of drive motors 83 and 83 fastened thereto, respectively, which are opposed to each other. And, in the left and right drive cases 82 and 82, the motor shaft 84 of each of the left and right drive motors 83 and 83 is fitted with a first gear 85 which is meshed with a second gear 86 which is in turn connected via a plurality of gears to a carrier 87 so that power generated by the drive motor 83 is transmitted via the first and second gears 85 and 86 and the other gears to the carrier 87. And, the carrier 87 has a hub 88 fastened thereto and the hub 88 has a wheel 90 mounted thereon and fitted with a tire 89.

Also, the left and right drive motors 83 and 83 have dry single disc brakes 91 and 91 fitted thereto, respectively, at their sides which are opposed to each other, so as to be braked by the dry brakes 91 and 91. Further, the left and right drive motors 83 are controlled by a controller so as to be synchronously operated.

As mentioned above, a pair of drive units for the conventional battery forklift in which left and right drive motors have dry single disc brakes fitted thereto at their sides which are opposed to each other, have required a large space between the left and right drive motors for receiving the dry single disc brakes which are large, thus presenting the problem that the drive units as a whole must become large sized. Especially, giving rise to the problem that the size must become large in the left-and-right direction that is widthwise of the vehicle body, there has been a hindrance to making vicinities of drive units compact in a battery forklift.

DISCLOSURE OF THE INVENTION

In order to solve the problems mentioned above, it is an object of the present invention to achieve making vicinities of drive units compact in a battery forklift by disposing a brake in the inside of a drive unit in the battery forklift.

The present invention also provides in a first aspect thereof a drive unit for a battery forklift, which is provided in a drive case with a first gear fitted on a motor shaft of a drive motor and a second gear in mesh with the first gear whereby power generated by the drive motor is transmitted via the first and second gears to a carrier, characterized in that the second gear disposed in the drive case is formed inside with a space in which a wet type brake section is disposed, the wet type brake section comprising an inner disk whose entire inner periphery is attached to the second gear, an outer disk which lies opposite to the inner disk and whose entire outer periphery is attached to a side of the drive case, and a pressure plate for pressing together the inner and outer disks lying opposite to each other.

The present invention provides in a second aspect thereof a battery forklift drive unit in the first aspect, characterized in that a mounting block is securely connected to the drive case side, the mounting block inhibiting the outer disk from moving in its radial direction and accepting as a whole a pressing force exerted from the pressure plate and a frictional braking torque generated when the outer and inner disks pressed together by the pressure plate is brought into intimate contact with each other.

The present invention also provides in a third aspect thereof a battery forklift drive unit in the first or second aspect thereof, characterized in that the drive unit includes a thrust mechanism comprising a cylinder block fastened to the drive case side, the cylinder block having therein a piston whose end has a rod fastened thereto in contact with the pressure plate in the wet type brake section and a push rod at a side opposite to that where the piston has the rod whereby when a service brake is operated, the piston is moved by fluid injected via a fluid passage to push the pressure plate via an end of the rod, to bring the outer and inner disks into intimate contact with each other and thereby to generate frictional braking torque between them and when a parking brake is operated, the piston is moved by the push rod pushed via a lever coupled to a wire connecting to a parking lever to push the pressure plate via an end of the rod, to bring the outer and inner disks into intimate contact with each other and thereby to generate frictional braking torque between them.

The present invention also provides in a fourth aspect thereof a battery forklift drive unit in the third aspect, characterized in that the drive unit further comprises a brake clearance adjuster for regulating a swing of the lever to push the push rod in the thrust mechanism to adjust a brake clearance for the inner and outer disks in the wet type brake section.

The present invention also provides in a fifth aspect thereof a battery forklift drive unit in the first or second aspect, characterized in that the drive unit includes: a thrust mechanism whereby when a service brake is operated, the pressure plate is pushed via a ring shaped piston by fluid injected via a fluid passage to push the pressure plate via an end of the rod, to bring the outer and inner disks into intimate contact with each other and thereby to generate frictional braking torque between them and when a parking brake is operated, the pressure plate is pushed, via and by a swing of, a lever coupled to a wire connecting to a parking lever to bring the outer and inner disks into intimate contact with each other and thereby to generate frictional braking torque between them; and a brake clearance adjuster for regulating the swing of the lever to adjust a brake clearance for the inner and outer disks in the wet type brake section.

The present invention also provides in a six aspect thereof a battery forklift drive unit in the first or second aspect, characterized in that the drive unit includes: a thrust mechanism whereby when a service brake and a parking brake are operated, the pressure plate is pushed, via and by a swing of, a lever coupled to a wire connecting to a parking lever and a wire interlocked with an operating brake pedal to bring the outer and inner disks into intimate contact with each other and thereby to generate frictional braking torque between them; and a brake clearance adjuster for regulating the swing of the lever to adjust a brake clearance for the inner and outer disks in the wet type brake section.

According to the present invention wherein the second gear included in the drive case is formed inwards with a space in which a wet type brake section is disposed, the need for a large space in which to dispose brakes in the vicinities of conventional drive units is eliminated, thereby permitting to achieve making the vicinities of drive units compact in a battery forklift.

Also, it is possible for the wet type brake section to be completely covered within the drive case and thus to prevent entry of mud, water and the like externally into the wet type brake section, hence largely mitigating problems such as of braking failure.

Also, by providing the clearance adjuster that adjusts the braking clearance in the inner and outer disks in the wet type brake section, it is possible to maintain the braking clearance in the inner and outer disks easily at a proper value when they are assembled or used to wear and consequently to eliminate various troubles in the wet type brake section. Moreover, since adjusting by the brake clearance adjuster is sufficient to adjust the brake clearance in the wet type brake section, it is possible to achieve a substantial simplification in operations to adjust the brake clearance in its assembling and during its use and it thus becomes possible to allow an operator to drive the vehicle at ease on an optimum constant adjustment of the brake clearance.

BRIEF DESCRIPTION OF THE DRAWINGS

In the Drawings:

FIG. 19 is an explanatory view of the conventional drive units for a battery forklift.

BEST MODES FOR CARRYING OUT THE INVENTION

An explanation is given of a first form of implementation of the present invention for a battery forklift drive unit. As a pair of drive units are arranged so as to be opposed to each other at the left and right hand sides of the body of a vehicle (forklift), only one at the left or right hand side will be mentioned and mention of the other of an identical structure will be omitted.

Figure 1:
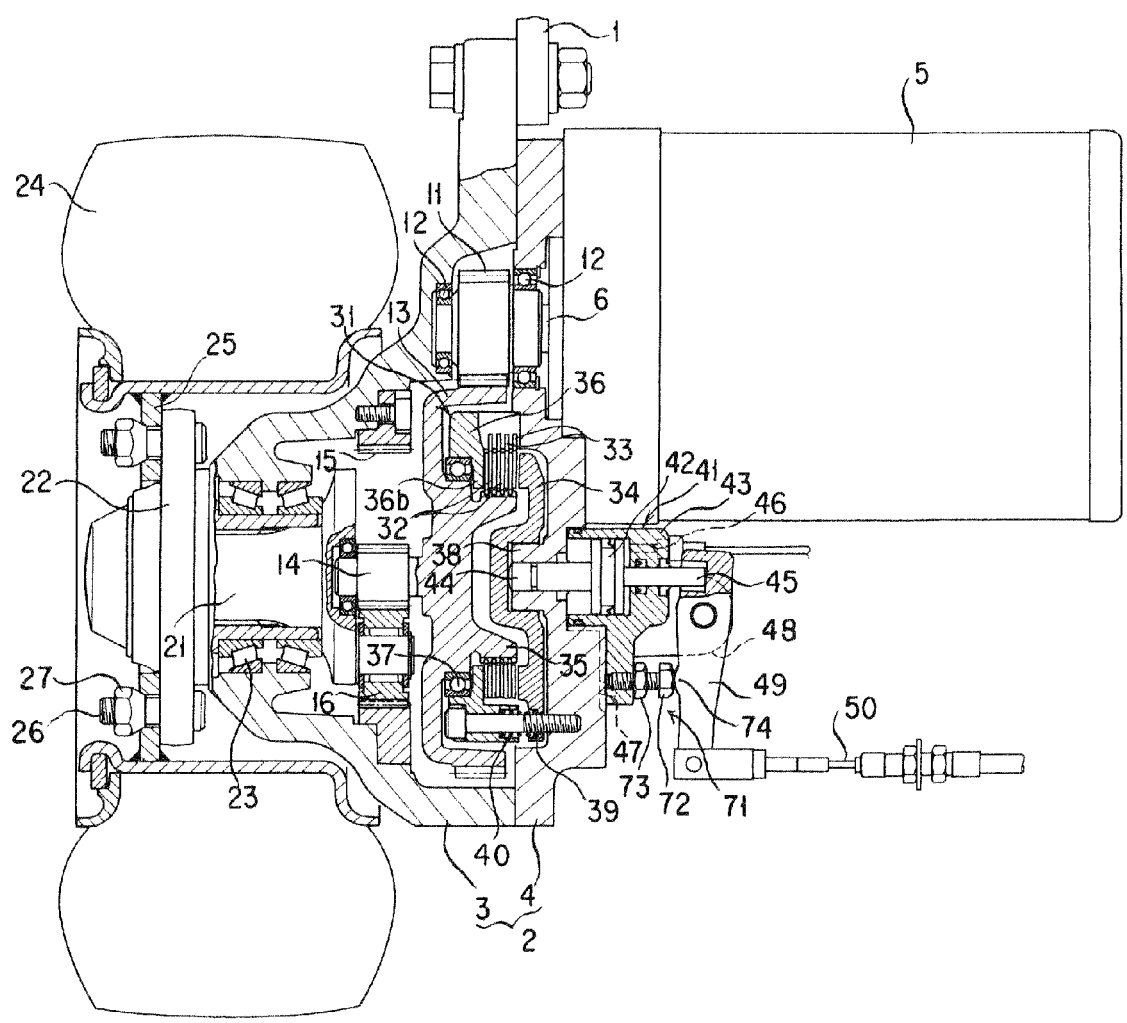
FIG. 1 is an explanatory view illustrating a first form of implementation of the drive unit for a battery forklift according to the present invention.

As shown in FIG. 1, a drive case 2 which is fastened to the vehicle body 1 comprises a hollow, substantially frusto-conical case 3 and a generally disk-like cover 4 fastened to the case 3 and is hollowed, forming a space inside thereof. In upper part of the drive case 2, a drive motor 5 is fastened to the cover 4 inside the vehicle body so that a motor shaft 6 of the drive motor 5 projects inside the drive case.

And, in the drive case 2, the motor shaft 6 of the drive motor 5 is spline-fitted with a first gear 11. The first gear 11 is rotatably supported via a bearing 12 by the case 3 and the cover 4 of the drive case 2. And, the first gear 11 is provided at its underside with a second gear 13 meshed therewith. The second gear 13 is formed with a space inside thereof.

Further, the second gear 13 centrally has a sun gear 14 fastened thereto outwards of the vehicle body and is provided around the sun gear 14 with a planetary gear 16 for revolution via a ring gear 15, the planetary gear 16 being rotatably mounted on a carrier 21. An outer periphery of the carrier 21 has a hub 22 spline-fitted thereon, the hub 22 being rotatably supported on the case 3 of the drive case 2 via a bearing 23. And, the hub 22 has a wheel 25 attached thereto with bolts 26 and nuts 27 and which is fitted with a tire 24.

With the makeup mentioned above, in driving the wheel 25 fitted with the tire 24, power generated by the drive motor 5 is transmitted from the first gear 11 to the second gear 13 and the sun gear 14 and from the sun gear 14 to the carrier 21 via the planetary gear 16. And, with power transmitted to the wheel 25 via the hub 22 fitted on the carrier 25, the wheel 25 and the tire 24 are driven.

Note that the second gear 13 and the sun gear 14 are rotated about the center of the carrier 21.

Also, in the drive case 2 in which a plurality of gears are arranged including the first gear 11, the second gear 13, the sun gear 14 and the planetary gear 16, a lubricating oil is introduced for lubrication of these gears. To this end, the drive case 2 is equipped at suitable places with an oil seal.

On the other hand, in the drive unit of such makeup, the second gear 13 disposed in the drive case 2 has its inside hollowed out and is formed inside with a space.

And, in the space formed inside the second gear 13 there is arranged a wet type brake section 31 which basically comprises an inner disk 32 whose entire inner periphery is attached to the second gear 13 so as to be rotatable with the second gear, an outer disk 33 which lies opposite to the inner disk 32 and whose entire outer periphery is attached to the side of the drive case 2 so as to be fixed in position and a pressure plate 34 for pressing together the inner and outer disks 32 and 33 opposite to each other to hold them in contact with each other.

To mention the dry type brake section 31 specifically, a plurality of the inner disks 32 which are ring shaped thin plates are attached to a disk mounting section 35 formed on an inner peripheral side of the second gear 13. In this case, the inner disk 32 is attached over its entire inner periphery to the disk mounting section 35 so as to be rotatable together with the second gear 13 about the center of the carrier 21.

Figure 2:
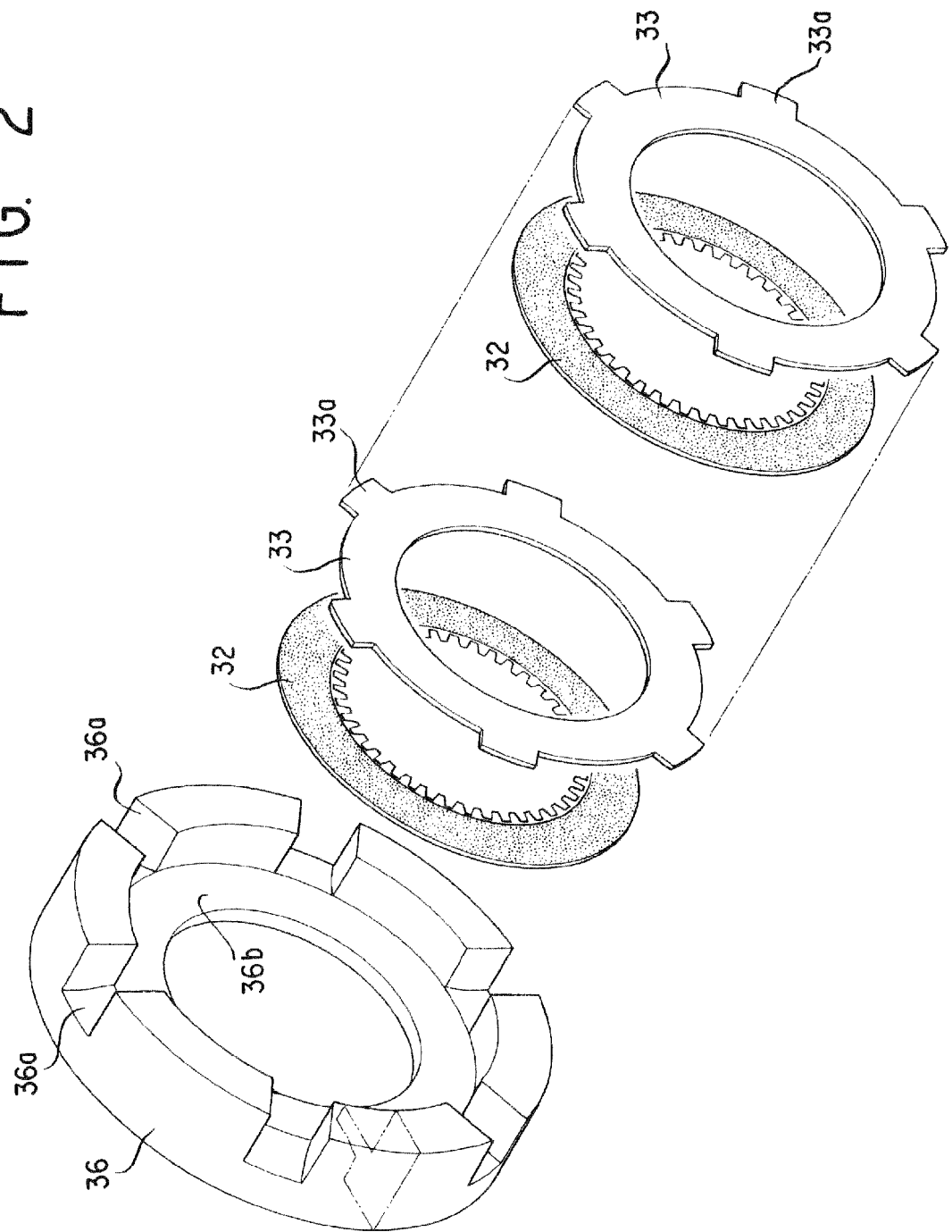
FIG. 2 is an explanatory view illustrating mounting state of an outer disk in a wet type brake section in the first form of implementation.

Also, a plurality of the outer disks 33 which are ring shaped thin plates are interposed between inner disks 32 to lie opposite to inner disks 32 while being attached to a ring shaped mounting block 36 securely connected to the cover 4 of the drive case 2. In this case, the outer disk 33 is attached over its outer periphery to the mounting block 36 as the drive case 2 side so as to be fixed in position. In attaching the outer disk 33 to the mounting block 36, as shown in FIG. 2 the outer disk 33 is formed equidistantly along its outer periphery with, e.g. six outer radial projections 33a and the mounting block 36 is formed with six grooves 36a corresponding to these outer radial projections 33a of the outer disk 33 to accept them. In this state of attachment, a portion of the mounting block 36 other than the grooves 36a prevents the outer disk 33 from moving in its radial direction (outward the periphery of the outer disk 33).

The mounting block 36 as the drive case 2 side is also formed with an inner flange portion 36b with which one entire surface of the inner disk 32 that is at the opposite side to that which is pressed by the pressure plate 34 is coming into contact. Note that if inner and outer disks 32 and 33 are alternately arranged and their innermost is an outer disk 33, then the outer disk 33 rather than the inner disk 32 over its entire one surface is coming to contact with the inner flange portion 36b of the mounting block 36.

So constructed, the mounting block 36 securely connected to the drive case 2 side, namely to the cover 4 of the drive case 2 inhibits the outer disk 33 from moving in its radial direction and at the same time is capable of accepting as a whole a pressing force from the pressure plate 34 and a frictional braking torque generated when the outer disk 33 and the inner disk 32 pressed by the pressure plate 34 are brought into intimate contact.

Note that in the combination of the inner and outer disks 32 and 33, only the inner disk 32 has a frictional material adhered on its surfaces.

Also, the second gear 13 having the inner disk 32 attached thereto is rotatably supported via a bearing 37 on the mounting block 36 of the drive case 2 side.

The pressure plate 34 pressing the inner and outer disks 32 together is generally in the form of a disk having a center concentric with the carrier 21 and is mounted on a columnar plate supporting portion 38 formed on the cover 4 of the drive case 2 so as to be movable slidably therewith. The pressure plate 34 is provided along its outer periphery with a plurality of outward protrusions 39 each equipped with a return spring 40. This allows the pressure plate 34 to be pressed against the cover 4 of the drive case 2 by means of the return spring 40.

And, in order for the pressure plate 34 to press the inner and outer disks 32 and 33, there is provided a thrust mechanism 41 that pushes the pressure plate 34 toward the inner and outer disks 32 and 33.

In the thrust mechanism 41, a cylinder block 43 incorporating a piston 42 is fastened by means of bolts (not shown) to the cover 4 of the drive case 2 and a rod 44 is integrally fastened to the piston 42 so that its end passing through the plate supporting portion 38 of the cover 4 lies in contact with the pressure plate 34. Also, the piston 42 integrally has a push rod 45 at the side opposite to that where it has the rod 44. Note that the piston 42, the rod 44 and the push rod 45 lie concentrically with the carrier 21 and the end of the rod 44 lies in contact with a center of the pressure plate 34.

And, the cylinder block 43 is formed with a fluid passage 46 to inject and drain a fluid, e.g., oil. With such as oil injected there, the piston 42 is moved to push the rod 44 against the pressure plate 34 so that the pressure plate 34 is thrust towards the inner and outer disks 32 and 33. Injection and draining of such as oil into and out of the fluid passage 46 are controlled based to an operation of a brake pedal (not shown) for working a service brake. Also, the cover 4 is formed with an air vent 47 to vent air in a space on the side of the rod 44. Note that the air vent 47 may alternatively be formed in the cylinder block 43.

Figure 3:
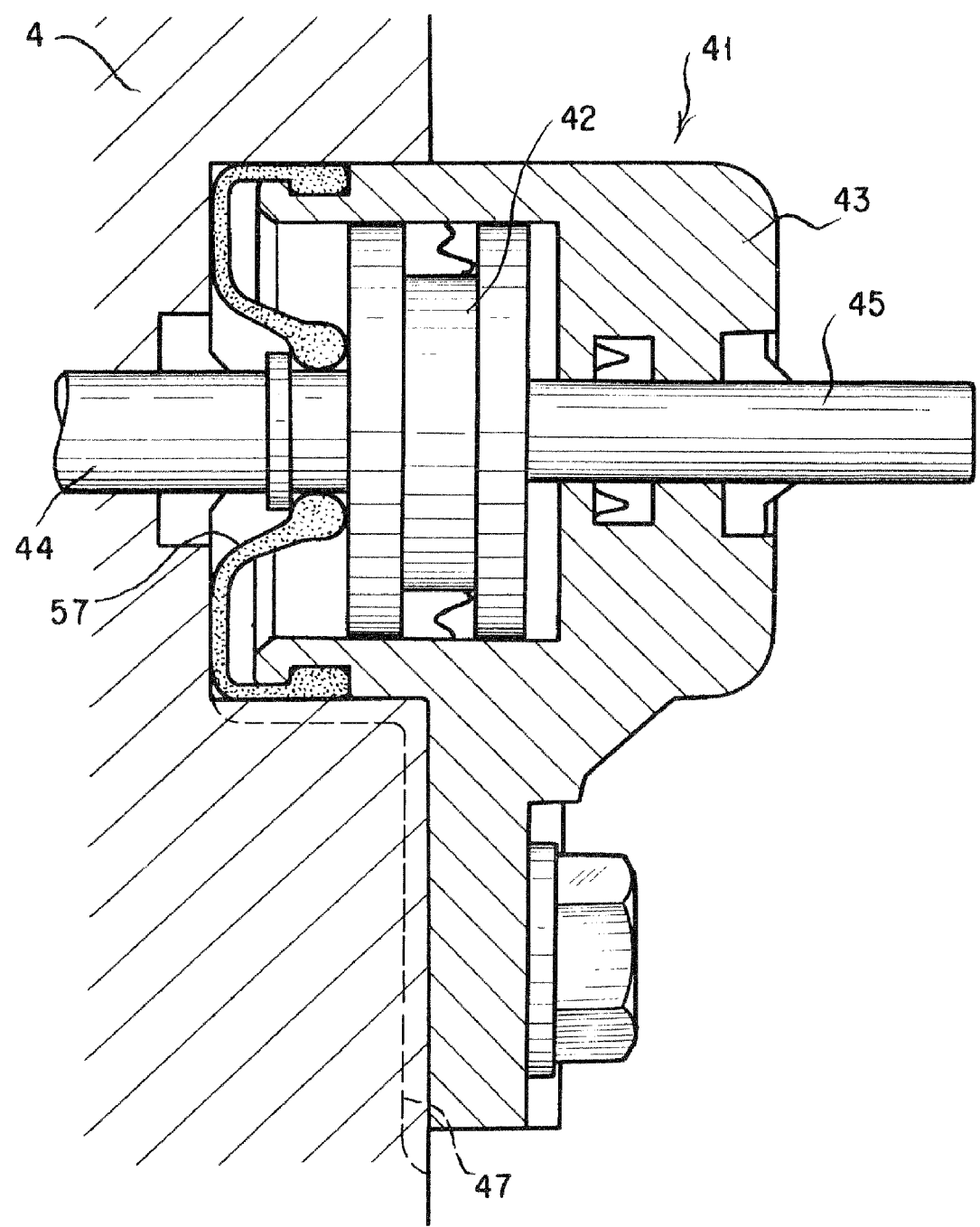
FIG. 3 is an explanatory view illustrating a thrust mechanism having a protective boot for the wet type brake section.

Also, if the air hole 47 to vent and admit air from and into the space of the rod 44 side is formed in the cover 4 or the cylinder block 43, there is then a possibility that dust, rainwater or muddy water may come in through the air hole 47 to damage a slide surface of the piston 42 of the thrust mechanism 41. To avoid this, as shown in FIG. 3 an annular rubber protective boot 57 may be fitted over from an outer peripheral side of the rod 44 to a side of the cylinder block 43 to form a structure such as to prevent dust, rainwater or muddy water if coming in through the air hole 47 from going further to the slide surface of the piston 42. Note that to protect the slide surface of the rod 44 in the thrust mechanism 41 (with the cover 4 of the drive case 2), a ring shaped seal may also be interposed between the rod 44 and the cover 4.

On the other hand, the cylinder block 43 is equipped via a pair of brackets 48 with a swing lever 49 whose upper end side lies in contact with a push rod 45 extending from the piston 42 to push the push rod 45 and whose lower end side is coupled to a wire 50 connecting to a parking lever.

With this thrust mechanism 41 which comprises the piston 42 inside of the cylinder block 43 fastened to the drive case 2, the rod 44 ahead of and connected to the piston 42 and the push rod 45 at the side opposite in the piston 42 to that where the rod 44 lies, it is possible to push the pressure plate 34 via the piston 42 and the rod 44 in both operations of where the service brake is to work and where the parking brake is to work. Moreover, the thrust mechanism 41 which is simple and uncomplicated per se in structure can be offered inexpensively while keeping occurrence of trouble such as fault to a minimum.

There is also provided a brake clearance adjuster 71 that adjusts the braking clearance in the inner disk 32 and outer disk 33 in the wet type brake section 31. In this connection, note that the braking clearance relates to the total amount of axial movement of the inner and outer disks 32 and 33 from the un-braked state that they are not in intimate contact, i.e., they are spaced apart so that no frictional braking torque is generated between them to the braked state that they are in intimate contact so that a frictional braking torque is generated. And, if the brake clearance is not proper in value, then trouble would occur that in operation of the brake pedal for the service brake to work, stepping on the brake pedal deeper (larger) will not let the brake begin operating or in operation of the parking lever for the parking brake to work, operating the parking lever will leave the braking effect poor.

Figure 4:
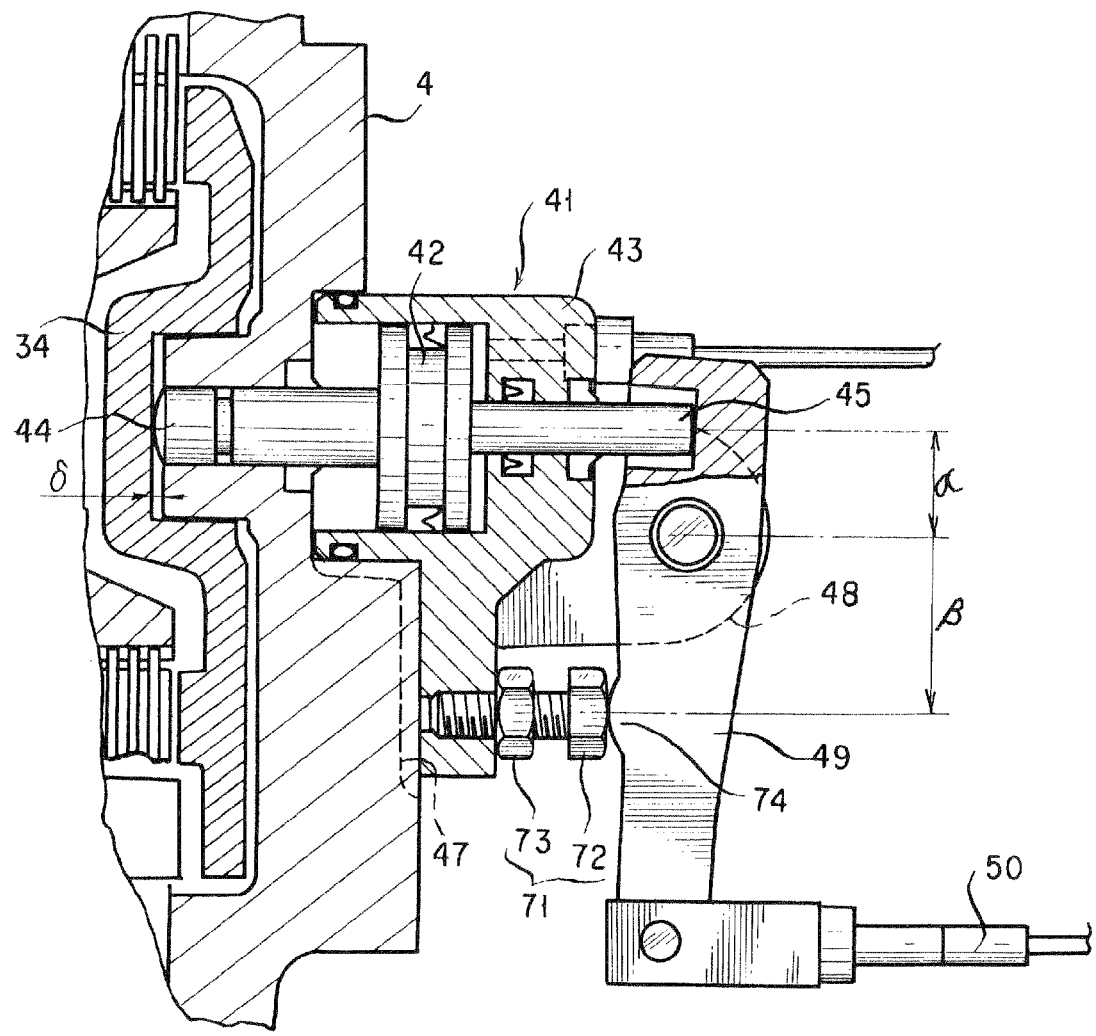
FIG. 4 is an explanatory view illustrating a brake clearance adjuster for the wet type brake section.

Accordingly, in order to eliminate such troubles, the brake clearance adjuster 71 is provided so that it can simply adjust the braking clearance. In the brake clearance adjuster 71 as shown in FIG. 4, under the cylinder block 43 in the thrust mechanism 41, an adjusting bolt 72 is provided so that it allows its protrusion in length to be adjusted, together with a lock nut 73 for fixing the adjusting bolt 72 when it protrudes by a predetermined length and a striker 74 formed in the form of a small protuberance on the lever 49 and hit with the adjusting bolt 72. And, the adjusting bolt 72 in the clearance adjuster 71 hitting against the striker 74 formed on the lever 49 regulates the leftward swing in FIG. 4 of the lever 49 and thus this regulation, via the piston 42, push rod 45 and rod 44 in the thrust mechanism 41, regulates the rightward movement in FIG. 4 of the pressure plate 34 in the wet type brake section 31 by pushing the pressure plate 34 so that it is not spaced from the inner and outer disks 32 more than a predetermined distance. And, adjusting the length of protrusion of the adjusting bolt 72 in the clearance adjuster 71 adjusts the braking clearance in the inner and outer disks 33 in the wet type brake section 31 to an appropriate value. Then, a clearance 6 required for the adjustment needs to be provided between the cover 4 and the pressure plate 34.

Thus, by providing the clearance adjuster 71 that adjusts the braking clearance in the inner and outer disks 32 and 33 in the wet type brake section 31 by regulating the swing of the lever 49 to push the push rod 45 in the thrust mechanism 41, it is possible to maintain the braking clearance in the inner and outer disks 32 constantly at a proper value and consequently to eliminate troubles in operating the brake pedal and in operating the parking lever as mentioned above. As a result, it is possible to get rid of cumbersome operations hitherto to adjust the clearance in the wet type brake section 31 to a proper value by combining various inner and outer disks 32 and 33 slightly varied in thickness so that their total thickness becomes a standard value for clearance adjustment.

Moreover, while to make the brake clearance proper in value it has hitherto been necessary to raise the conformity to specifications (dimensional accuracies in thickness) of each of the inner and outer disks 32 and 33 and the pressure plate 34 in the wet type brake section 31 and the conformity to specifications (dimensional accuracy) of each of the piston 42, rod 44 and push rod 45 in the thrust mechanism 41 and further that of the lever before they are assembled, providing the clearance adjuster 71 to allow the clearance to be easily adjusted thereby after these are assembled can eliminate cumbersome operations attendant on their conformation. Also, while the repeated use of the wet type brake section 31 may increase the brake clearance as a result of gradual wear of such as inner and outer disks 32 and 33, adjusting the brake clearance with the clearance adjuster 71 within tolerance limits of wear of such as inner and outer disks 32 and 33 allows maintaining the clearance at optimum. It can eliminate an operation to take the trouble of decomposing the drive case 2 in order to exchange such as inner and outer disks 32 and 33 and allows these components to be used until their wears reach their tolerance limits of wear, thus to be used usefully and efficiently to their ends.

As to how the adjusting bolt 72 and the striker 74 can be positioned in the tolerance adjuster 71, note that distance $\beta$ from the center of swing of the lever 49 to the position where the adjusting bolt 72 hits the striker 74 should be larger than distance $\alpha$ from the center of swing of the lever 49 to the position where the lever 49 makes contact with the push rod 5. So making the distance $\beta$ larger than the distance $\alpha$ makes a change in protrusion length of the adjusting bolt 72 greater than a change of the clearance in the inner and outer disks 32 and 33 of the wet type brake section 31 and thus facilitates adjusting the length of protrusion of the adjusting bolt 72 and hence facilitates fine adjustment of the brake clearance in the inner and outer disks 32 and 33 in the wet type brake section 31.

Figure 5:
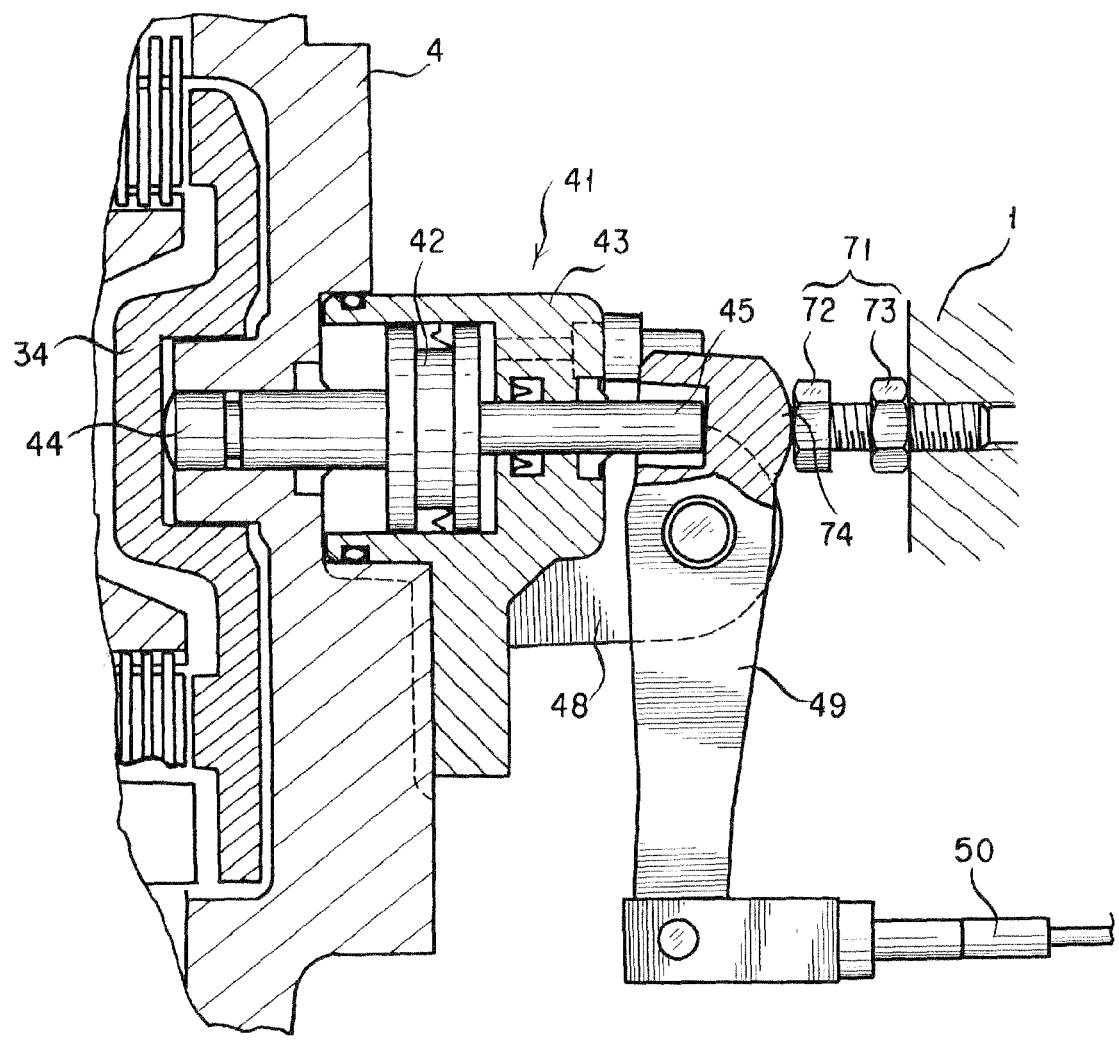
FIG. 5 is an explanatory view of an alternative brake clearance adjuster for the wet type brake section.

However, a clearance adjuster 71 should not be limited to that described above and may be of a structure opposite to that described above i.e., wherein the cylinder block 43 in the thrust mechanism 41 is formed on its lower part with a striker 74 in the form of a small protuberance and the lever 49 is provided with an adjusting bolt 72 whose protrusion in length to hit on the striker 74 formed on the cylinder block 43 is variable, together with a lock nut 73 for locking the adjusting bolt 72 when it protrudes by a predetermined length so that the adjusting bolt 72 regulates the leftward swing in FIG. 4 of the lever 49, thereby adjusting the brake clearance in the wet type brake section 31 to an appropriate value. Also, as shown in FIG. 5, a striker 74 in the form of a small protuberance may be formed on an upper part of the lever 49 at a position as high as the push rod 45 in the thrust mechanism 41 while a bracket on the side of the vehicle body 1 is provided with an adjusting bolt 72 whose protrusion in length to hit on the striker 74 formed on the upper part of the lever 49 is variable, together with a lock nut 73.

Mention is next made of operations of the thrust mechanism 41 and the wet type brake section 31.

When an operator steps on the brake pedal to actuate the service brake, oil or the like is injected in the fluid passage 46 in the cylinder block 43 to move the pressure plate 34 via the piston 42 and the rod 44 and causes the pressure plate 34 to press the inner and outer disks 32 and 33 so as to bring them into intimate contact with each other. Then, frictional braking torque generated in the inner and outer disks 32 and 33 causes the second gear 13 to cease rotating. The vehicle's inertial energy transmitted via the tire 24 is thereby cut off, wheel 25, hub 22, carrier 21, planetary gear 16 and sun gear 14, and the vehicle is braked.

And, when the operator detaches the foot from the brake pedal to de-actuate the service brake, oil or the like is ceased from flowing into the fluid passage 46 in the cylinder block 43. The pressure plate 34 is returned towards the caver 4 by the return spring 40 to release the inner and outer disks 32 and 33 from pressing. This allows the second gear 13 to rotate, transmitting the power from the drive motor 5 to the carrier 21 and thereby rotating the hub 22 and the wheel 25.

On the other hand, when the operator draws the parking lever to actuate the parking brake, the lever 49 is swung via the wire 50, pushing the push rod 45 and thereby moving the pressure plate 34 via the piston 42 and the rod 44. Pressed by the pressure plate 34, the inner and outer disks 32 and 33 are brought into intimate contact with each other, generating the frictional braking torque therein and thereby ceasing the second gear 13 from rotating. The vehicle's inertial energy transmitted via the tire 24, wheel 25, hub 22, carrier 21, planetary gear 16 and sun gear 14 is thereby cut off, and the vehicle is braked.

Also, when the operator restores the parking lever to de-actuate the parking brake, the push rod 45 is ceased from being pushed by the lever 49 and the pressure plate 34 is returned towards the caver 4 by the return spring 40 to release the inner and outer disks 32 and 33 from pressing. This allows the second gear 13 to rotate, transmitting the power from the drive motor 5 to the carrier 21 and thereby rotating the hub 22 and the wheel 25.

Figure 6:
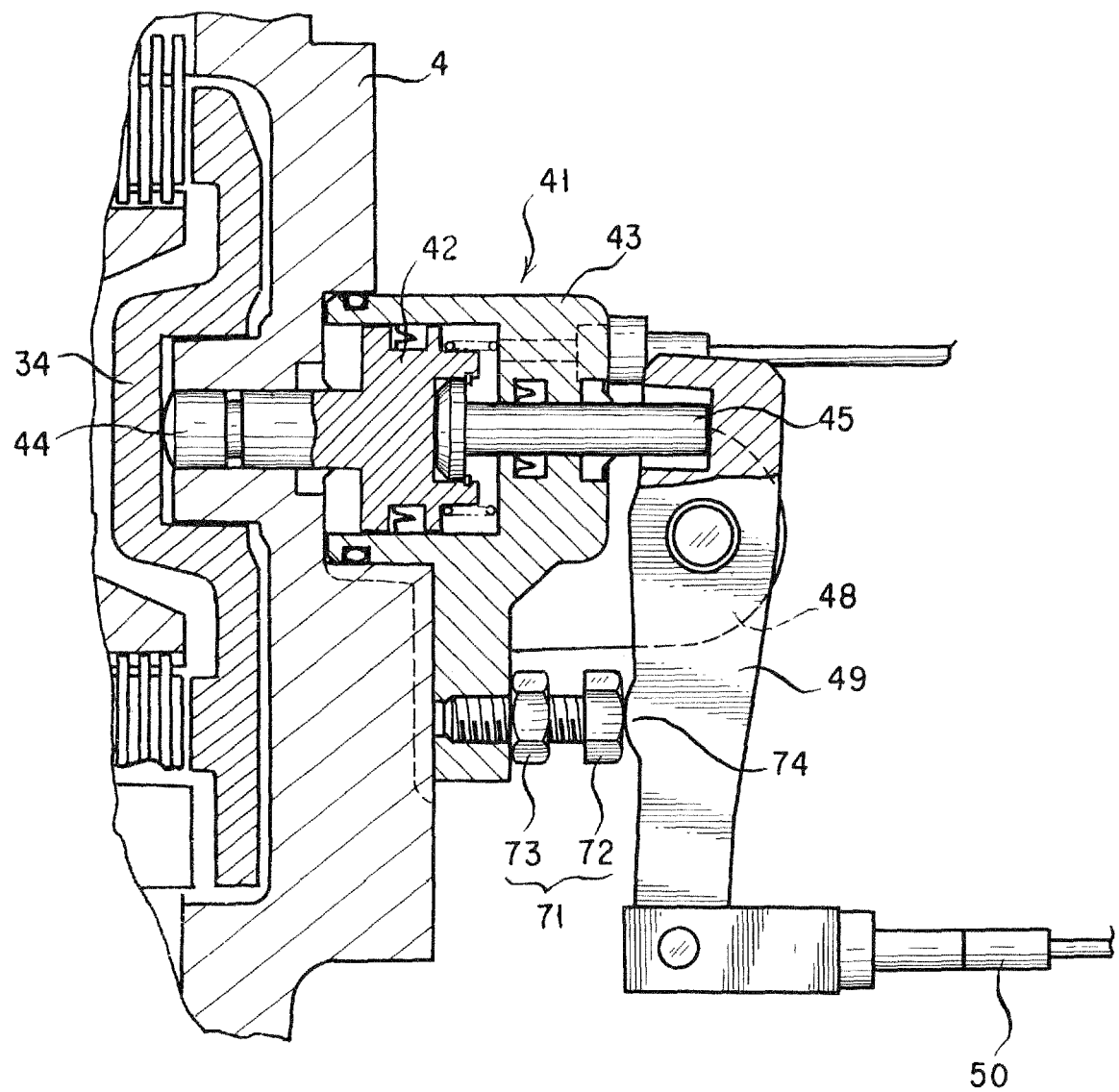
FIG. 6 is an explanatory view of an alternative thrust mechanism for the wet type brake section.
Figure 7:
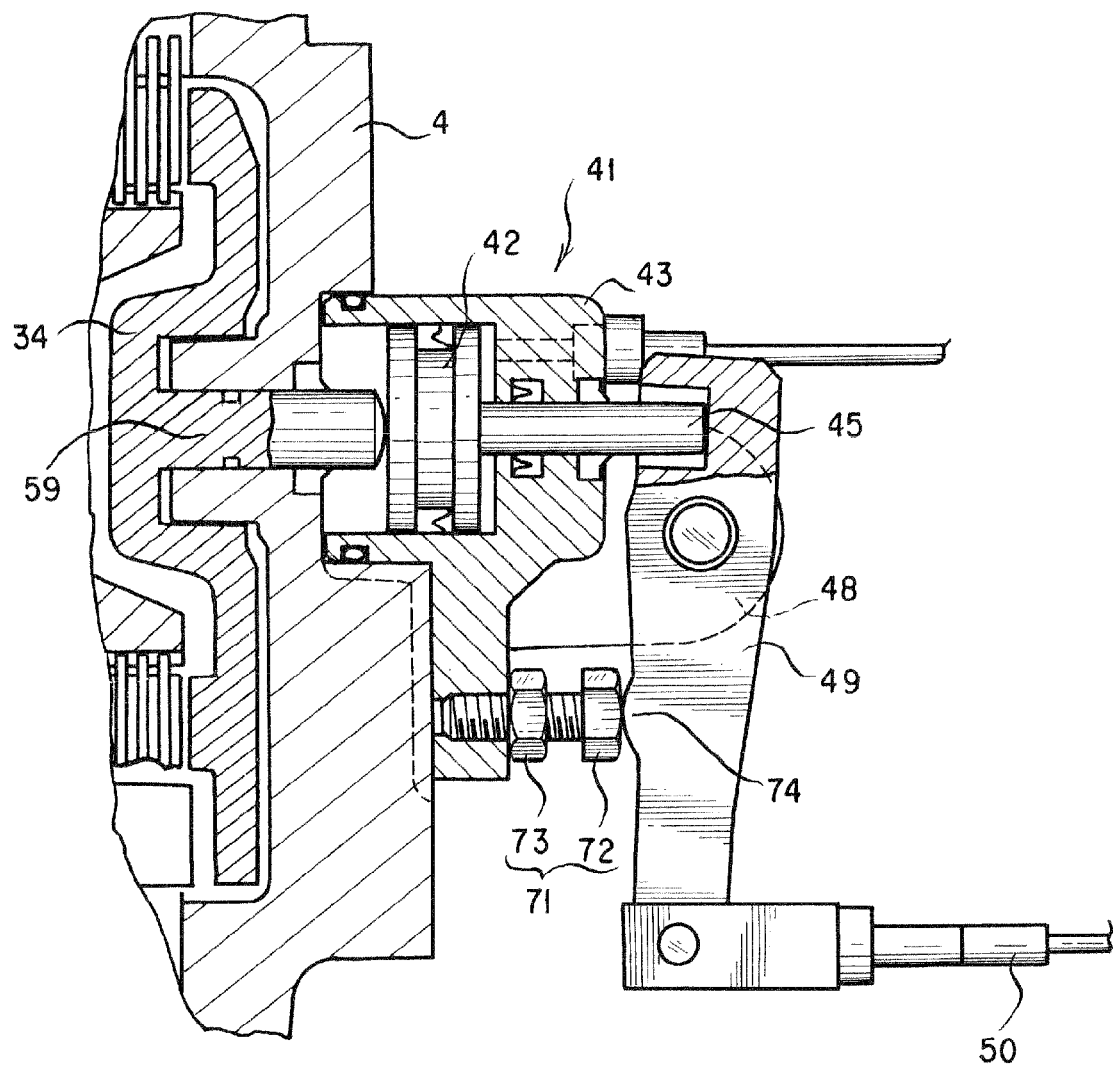
FIG. 7 is an explanatory view of alternative pressure plate and thrust mechanism for the wet type brake section.

While in the first form of implementation described above, the piston 42, the rod 44 and the push rod 45 in the thrust mechanism 41 are shown made integral with one another, they may be in a dichotomized structure in which the push rod 45 as shown in FIG. 6 is separate from the piston 42 and rod 44 or in a trichotomized structure in which the piston 42, the rod 44 and the push rod 45 are separate from one another. Adopting such a separable structure may facilitate machining and manufacturing and reduce the manufacturing cost. On the other hand, rather than of the piston 42, rod 44 and push rod 45, the thrust mechanism may, as shown in FIG. 7, be made of the piston 42 and push rod 45. And, a rod 59 corresponding to the rod 44 can be formed integrally of the pressure plate 34 so that the piston 42 in the thrust mechanism 41 may directly be contacted with the rod 59 in the pressure plate 34.

In the battery forklift drive unit so constructed as mentioned above in which the second gear 13 disposed in the drive case 2 has its inside hollowed out and is formed inside with a space and the wet type brake section 31 is disposed in the space formed inside of the second gear 13, it is possible to make a large space unnecessary for disposing brakes in the vicinities of drive units, thereby to achieve making the vicinities of drive units compact in a battery forklift. It is in its turn possible to make a forklift small-sized and light-weighted. Especially, while in the conventional forklift having the dry single disc brake fitted with the drive motor there has been the problem that the size of a drive unit must become large in the left-and-right direction that is widthwise of the vehicle body, disposing the wet type brake section 31 in the inside of the second gear 13 in the drive case 2 of the drive unit in accordance with the present invention can make its size small in the widthwise direction of the vehicle body 1.

Also, by disposing the wet type brake section 31 in the inside of the second gear 13 disposed in the drive case 2, it is possible for the wet type brake section 31 to be completely covered within the drive case 2 and thus to prevent entry of mud, water and the like externally into the wet type brake section 31, hence largely mitigating problems such as of braking failure. Using as oil for lubricating the wet type brake section 31, oil for lubricating the various gears included in the drive case 2 eliminates the need to prepare oil for exclusive use in the wet type brake section 31 and makes it possible to manufacture the wet type brake very inexpensively.

On the other hand, by attaching the entire inner periphery of the inner disk 32 and the entire outer periphery of the outer disk 33, respectively, to the disk mounting block 35 of the second gear 13 and the mounting block 36 fastened to the cover 4 of the drive case 2, it is possible to mount the inner and outer disks 32 and 33 firmly and securely in the wet type brake section 31 and to eliminate the problem on their strength. Moreover, since the mounting block 36 is formed with the inner flange portion 36b with which one entire surface of the inner disk 32 that is at the opposite side to that which is pressed by the pressure plate 34 is coming into contact to hold the inner disk 32 with the inner flange portion 36b, the mounting block 36 is capable of accepting as a whole a pressing force from the pressure plate 34 and a frictional braking torque generated when the outer disk 33 and the inner disk 32 pressed by the pressure plate 34 are brought into intimate contact. And, since if the mounting block 36 receives an intense pressing force from the pressure plate 34, it is then capable of reliably accepting the same, the pressing force from the pressure plate 34 can be made intense, hence a strong braking force can be exerted stably.

And, since the inner disk 32 which on the side of the second gear 13 has a frictional material adhered on its surfaces is rotated together with the second gear 13, the frictional material adhered on the surfaces of the inner disk 32 can be prevented from its partial wear and the frictional material over the surfaces of the inner disk 32 can be delayed of its wear; hence the inner disk 32 can be delayed of its timing of exchange and can be used for an extended period of time, thereby reducing the cost of maintenance of the wet type brake section 31.

The reason is as follows: Conventionally, since lubricating oil introduced in the drive case 2 is filled only up to about one half of the height of the inner or outer disk 32, 33 in the wet type brake section 31, a desired amount of lubricating oil will not easily reach the upper end of the inner or outer disk 32, 33. Consequently, e.g., in the system in which the inner disk 32 having the frictional material adhered thereon is fixed and the outer disk 33 is rotated, lubricating oil tends to fail to reach the upper end of the inner disk 32 so that the frictional material at the upper end of the inner disk 32 is quickly wearing out, causing a partial wear of frictional material of the inner disk 32 (more at the upper side). This makes it necessary to exchange the inner disk 32 promptly. However, if the inner disk 32 having the frictional material adhered on its surfaces is rotated as in this form of implementation, the inner disk 32 each time it has one rotation soaks in lubricating oil to have lubricating oil spreading over its entire body. Thus, the frictional material adhered on the surfaces of the inner disk 32 becomes prevented from its partial wear.

In this connection, it should be noted that while augmenting the lubricating oil can solve the problem of partial wear of the frictional material on the inner disk 32, augmenting the lubricating oil increases the drag torque of the disk, giving rise to problems such as that power consumption for the drive motor 5 becomes larger and oil leakage tends to be brought about.

Mention is next made of several other forms of implementation of the battery forklift drive unit according to the present invention. They basically are substantially identical to the form of implementation described above but differ largely in the thrust mechanism 41.

Figure 8:
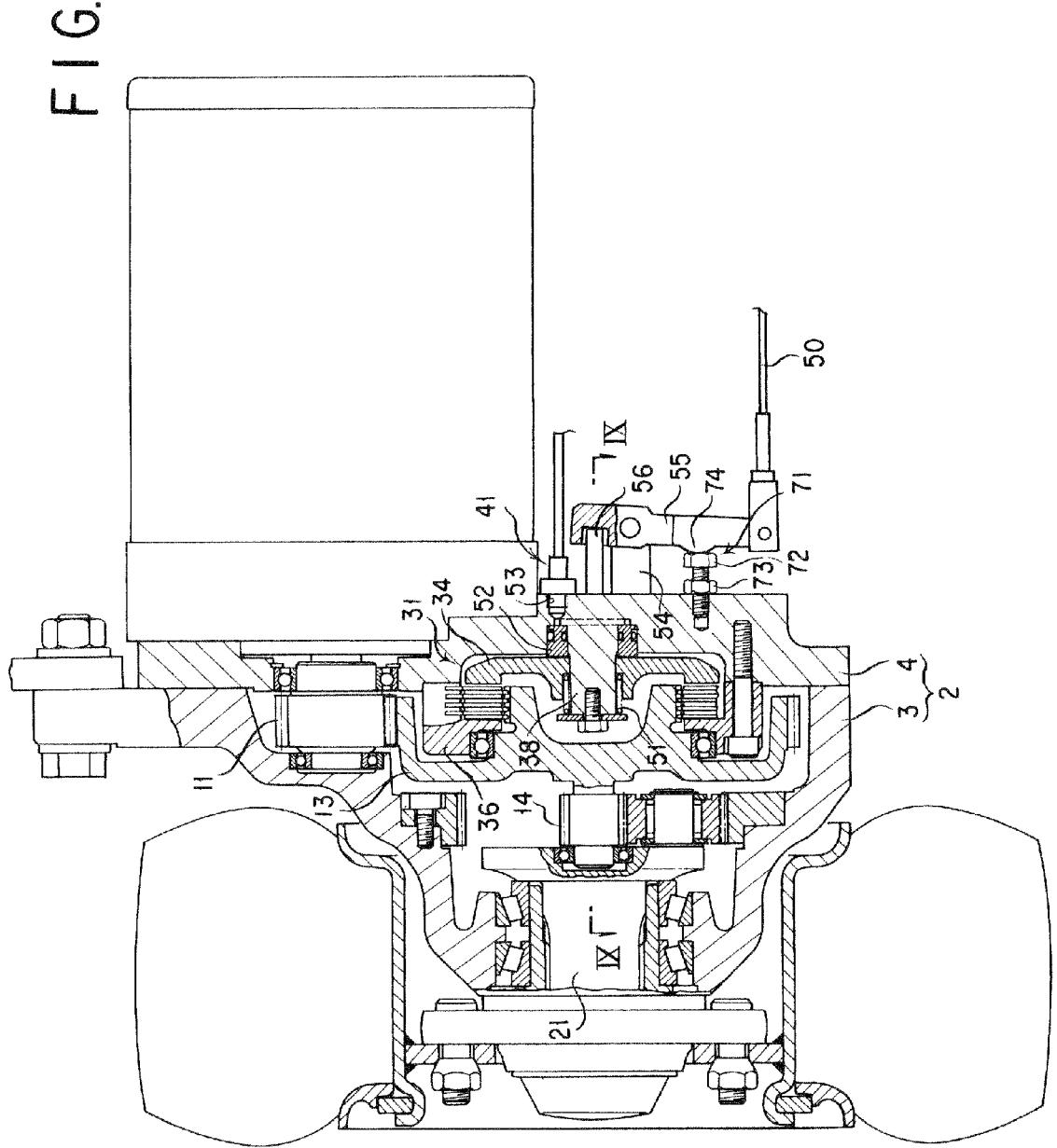
FIG. 8 is an explanatory view illustrating a second form of implementation of the drive unit for a battery forklift according to the present invention.
Figure 9:
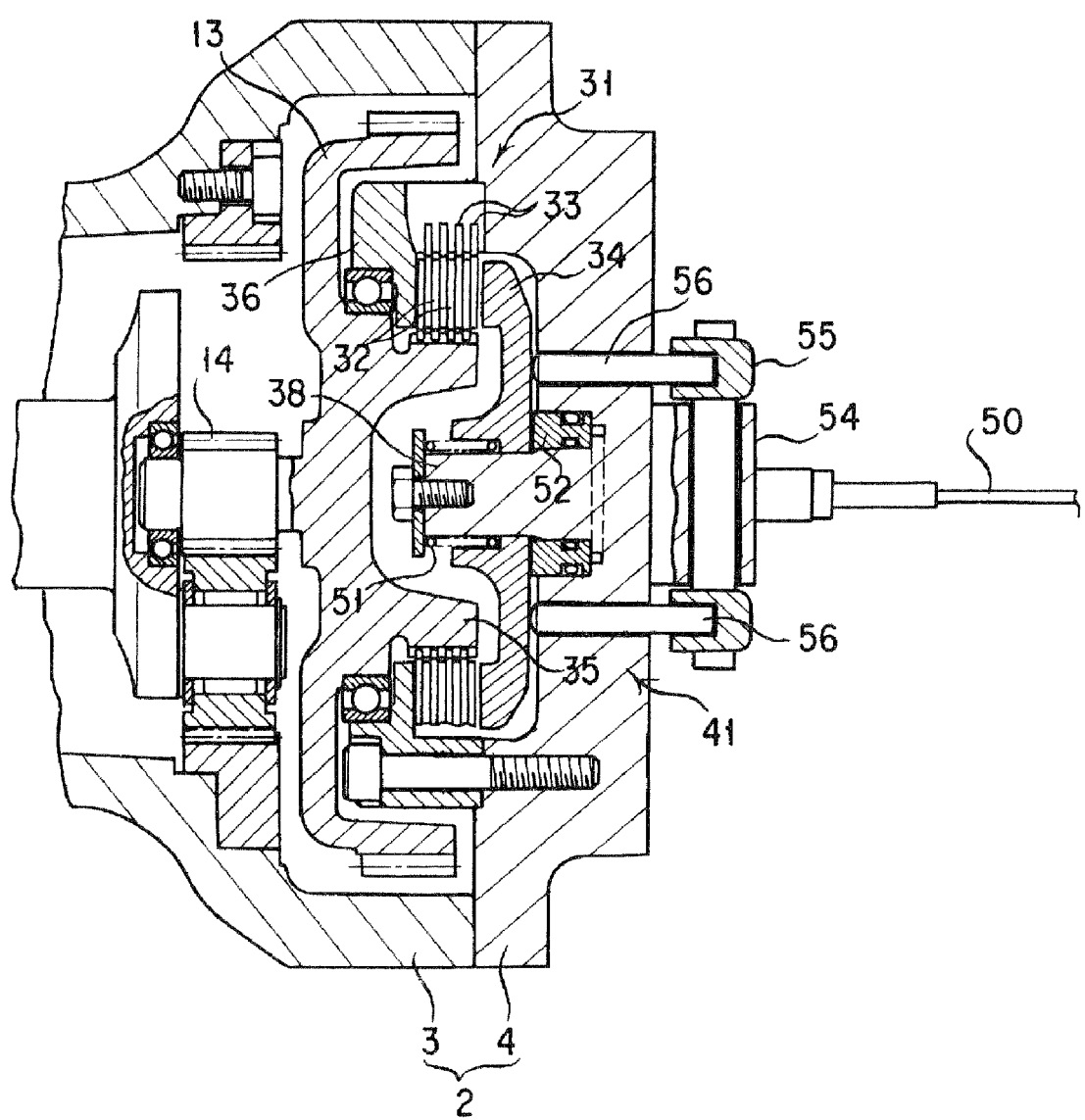
FIG. 9 is a cross sectional view taken along the line IX-IX in FIG. 8.

In a second form of implementation as shown in FIGS. 8 and 9 the pressure plate 34 first is slidably mounted on the plate supporting portion 38 of the cover 4 in the drive case 2 and pushed against the cover 4 in the drive case 2 by a return spring 51 disposed around the plate supporting portion 38.

And, the thrust mechanism 41 is provided with a ring shaped piston 52 slidable around the plate supporting portion 38 in the cover 4 so that an end of the ring shaped piston 52 is held in contact with the pressure plate 34. And, oil or the like injected into a fluid passage 53 formed in the cover 4 moves the piston 52 to push the pressure plate 34, pressing the pressure plate 34 against the inner and outer disks 32 and 33. Oil or the like is injected into and drained from the fluid passage 53, controllably in accordance with the operation of the brake pedal (not shown).

On the other hand, the cover 4 is provided via brackets 54 with a swing lever 55 whose upper end portion is bifurcated into two branches each having a push rod 56. This pair of push rods 56 is passed through the cover 4 and in contact with the pressure plate 34. The lever 55 also has its lower ends side coupled to the wire 50 connecting to the parking lever.

Also, for adjusting the braking clearance in the inner disk 32 and outer disk 33 in the wet type brake section 31 there is provided a brake clearance adjuster 71 which is of substantially same construction as in the first form of implementation described above and in which the cover 4 of the drive case 2 is provided with the adjusting bolt 72 together with the lock nut 73 while the lever 55 is formed with the striker 74 in the form of a small protuberance so that the adjusting bolt 72 regulates the leftward swing in FIG. 8 of the lever 55 to adjust the brake clearance in the wet type brake section 31 to an appropriate value.

Thus, as means for pressing the pressure plate 34 against the inner and outer disks 32 and 33 there are provided means using the ring shaped piston 52 in stepping on the brake pedal to actuate the service brake and means using the pair of push rods 56 in pulling the parking lever to actuate the parking brake, these means being made separate thoroughly. Hence a very safety structure wherein if one of these fails for any trouble, the other means can effect braking by pressing the pressure plate 34 against the inner and outer disks 32 and 33 for braking.

Figure 10:
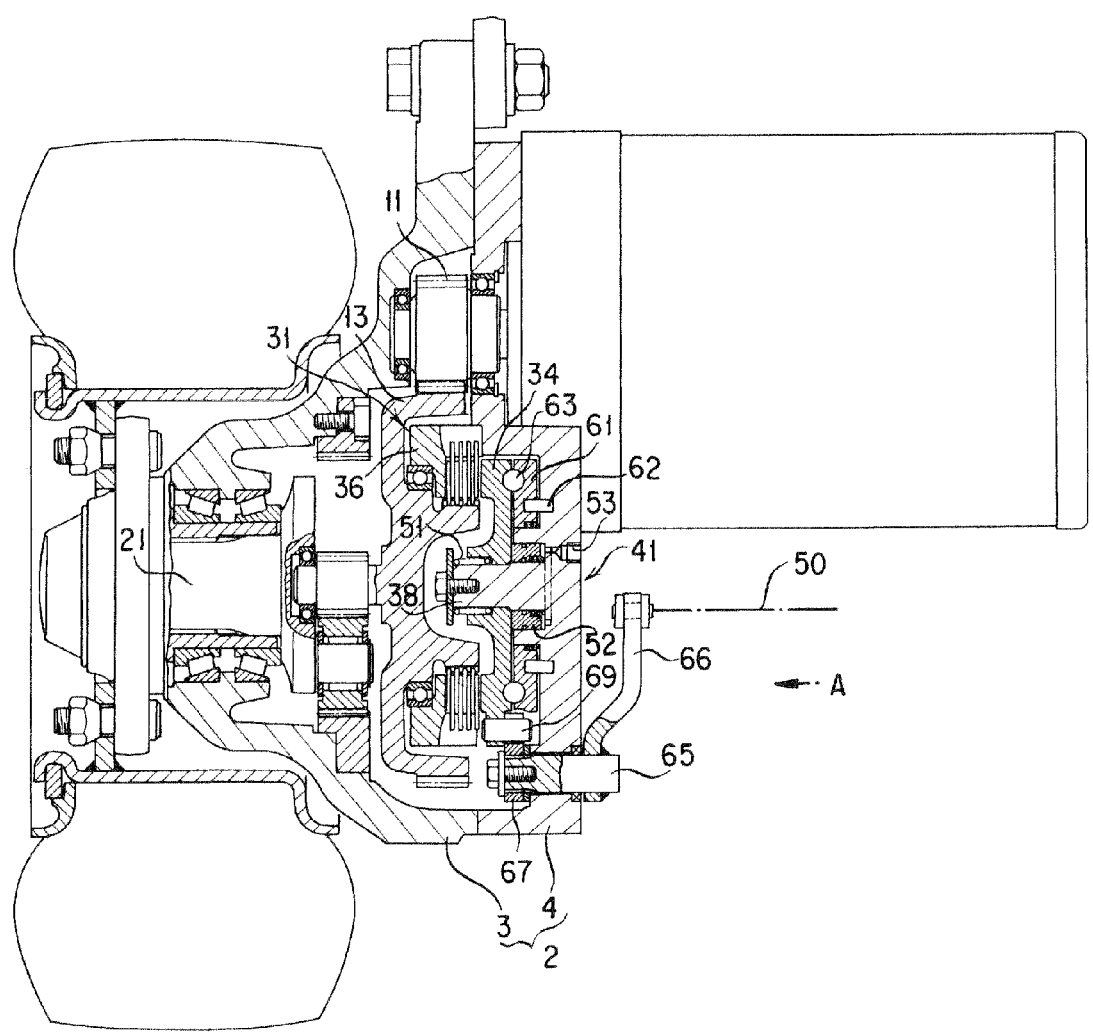
FIG. 10 is an explanatory view illustrating a third form of implementation of the drive unit for a battery forklift according to the present invention.

In a next, third form of implementation as shown in FIG. 10, the pressure plate 34 first is slidably mounted on the plate supporting portion 38 of the cover 4 in the drive case 2 and pushed against the cover 4 in the drive case 2 by a return spring 51 disposed around the plate supporting portion 38.

And, the thrust mechanism 41 as in the second form of implementation described above is provided with a ring shaped piston 52 slidable around the plate supporting portion 38 in the cover 4 so that an end of the ring shaped piston 52 is held in contact with the pressure plate 34. And, oil or the like injected into a fluid passage 53 formed in the cover 4 moves the piston 52 to push the pressure plate 34, pressing the pressure plate 34 against the inner and outer disks 32 and 33. Oil or the like is injected into and drained from the fluid passage 53, controllably in accordance with the operation of the brake pedal (not shown).

Figure 11:
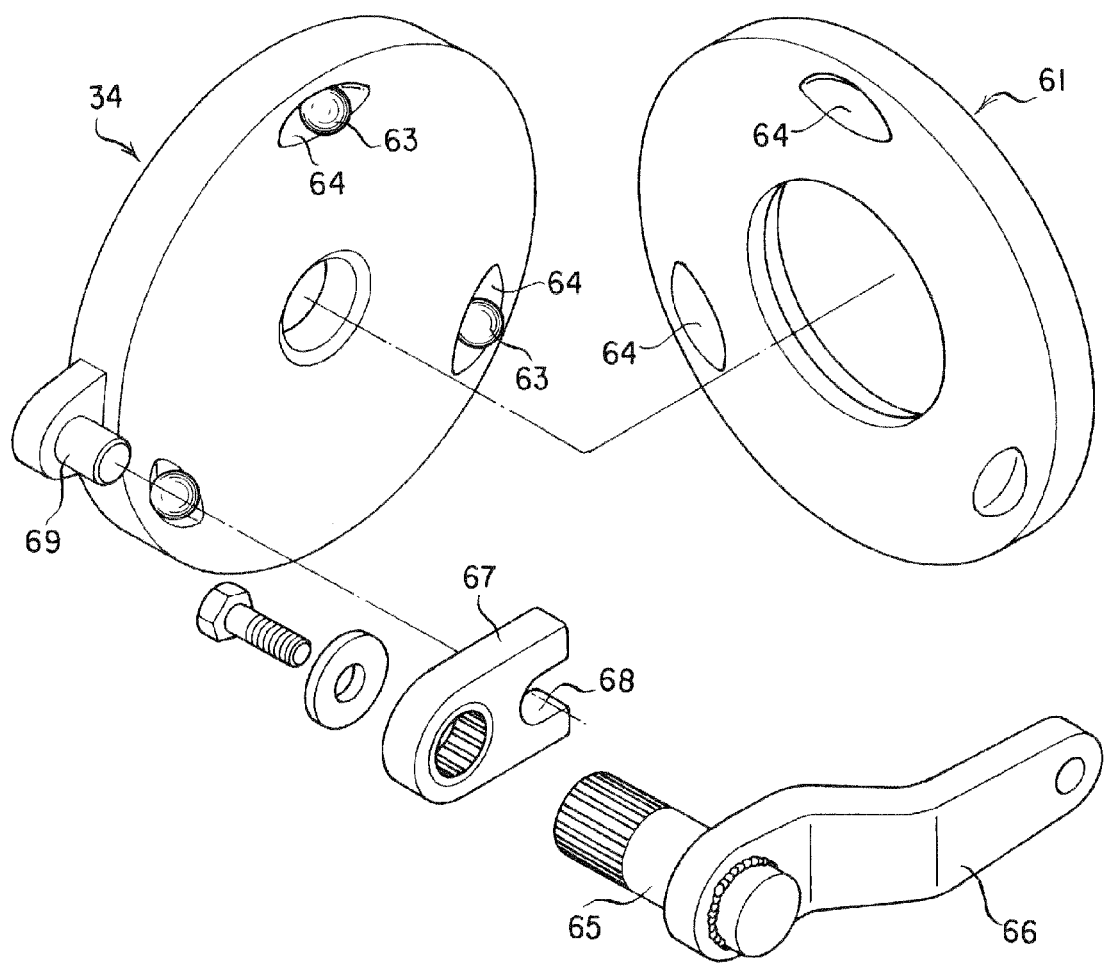
FIG. 11 is an exploded perspective view diagrammatically illustrating a thrust mechanism in a wet type brake section in the third form of implementation.
Figure 12A:
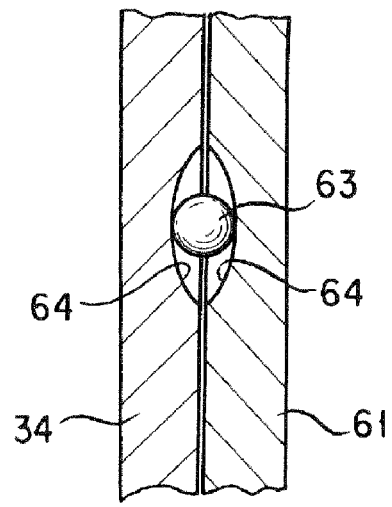
FIGS. 12A and 12B are explanatory views illustrating operating states of pressure and ring plates by a ball in the thrust mechanism.

On the other hand, the cover 4 has a ring plate 61 in the form of a ring attached thereto via a knock pin 62 so as to lie opposite the pressure plate 34. And, a plurality of balls 63 are disposed between the ring plate 61 and the pressure plate 34 over their peripheries. As shown in FIGS. 11 and 12A, the ring plate 61 and the pressure plate 34 are formed, where each of the balls 63 is disposed, with a pair of opposed semi-elliposoidal sloped grooves 64 so that each ball 63 is received therein. And, the cover 4 is provided at its lower end with a shaft 65, to one end of which a swing lever 66 is fastened. The lever 66 at its upper end side has the wire 50 coupled thereto, the wire 50 connecting to the parking lever. The other end of the shaft 65 has a swing arm 67 fastened thereto. The arm 67 is engaged via a U-shaped groove 68 at its upper end with a pin 69 fastened to the lower end of the pressure plate 34.

Figure 13:
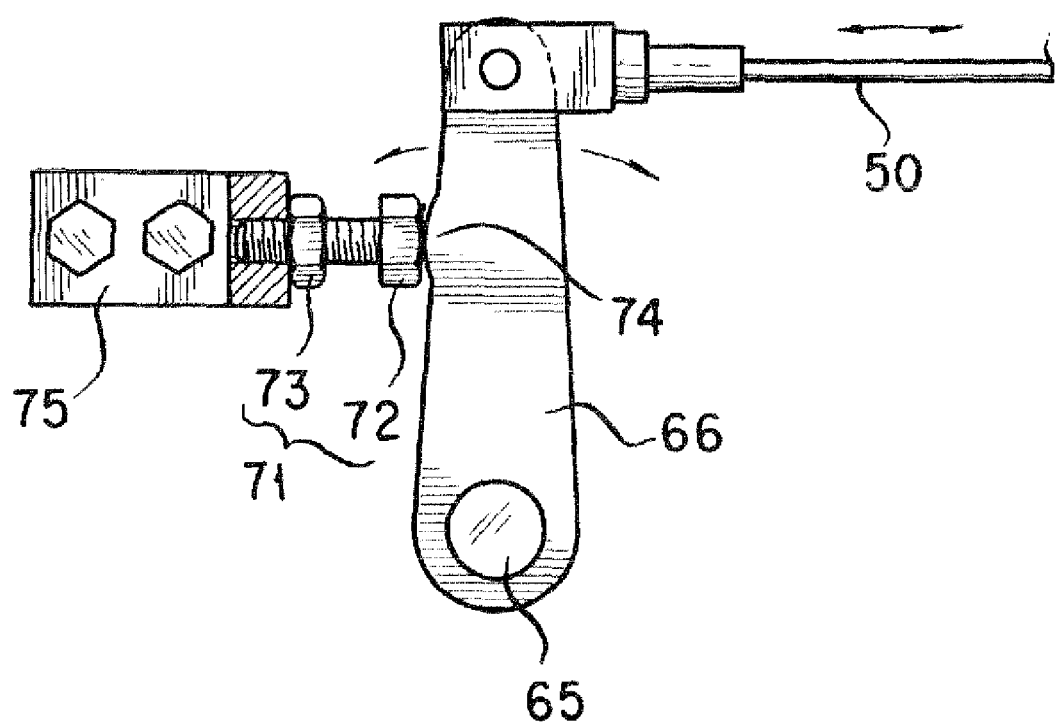
FIG. 13 is a view as seen in the direction of arrow A in FIG. 10.

Also, for adjusting the braking clearance in the inner disk 32 and outer disk 33 in the wet type brake section 31 there is provided a brake clearance adjuster 71 which is of substantially same construction as in the forms of implementation described above. In this brake clearance adjuster 71 as shown in FIG. 13, a bracket 75 on the side of the vehicle body 1 is provided with the adjusting bolt 72 together with the lock nut 73 while the lever 66 on its side face is formed with the striker 74 in the form of a small protuberance so that the adjusting bolt 72 regulates the leftward swing in FIG. 13 of the lever 66 to adjust the brake clearance in the wet type brake section 31 to an appropriate value.

Mention is next made of an operation of the thrust mechanism 41. When the operator steps on the brake pedal, oil or the like is injected in and drained from the fluid passage 53 in the cover 4 to move the pressure plate 34 via the ring shaped piston 52 and causes the pressure plate 34 to press the inner and outer disks 32 and 33 and to release them from pressing.

Figure 12B:
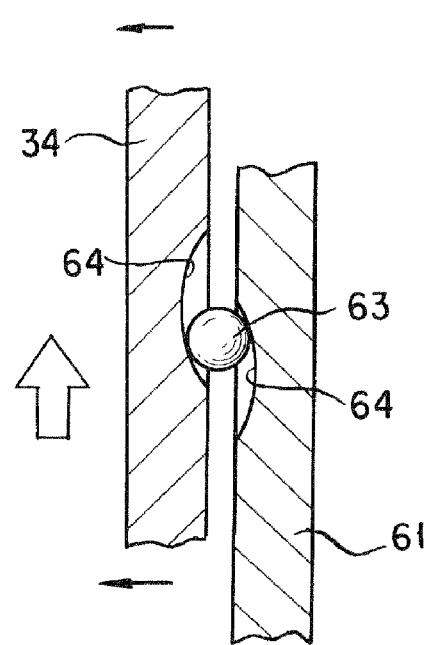

On the other hand, when the operator pulls the parking lever to actuate the parking brake, the lever 66 is caused to swing via the wire 50, swinging the arm 67 interlocked therewith. This causes the pressure plate 34 to rotate slightly about the plate supporting portion 38 in the cover 4. And, a slight rotation of the pressure plate 34 as shown in FIG. 12B causes each ball 63 received in the opposed sloped grooves 64 between the pressure plate 34 and the ring plate 61 to get out of the sloped grooves 64, enlarging the opening between the pressure and ring plates 34 and 61. The balls 63 operating to enlarge the gap between the pressure and ring plates 34 and 61 moves the pressure plates 34 and urges it to press the inner and outer disks 32 and 33.

Also, when the operator restores the parking lever to de-actuate the parking brake, the lever 66 is restored to return the pressure plate 34 via the arm 67 to its original position. Then, the balls 63 disposed between the pressure plate 34 and the ring plate 61 are stored back within the opposed sloped grooves 64 so that the gap between the pressure and ring plates 34 and 61 are narrowed to be restored. And, with the restored gap between the pressure and ring plates 34 and 61, the inner and outer disks 32 and 33 are released from pressing by the pressure plate 34.

Figure 14:
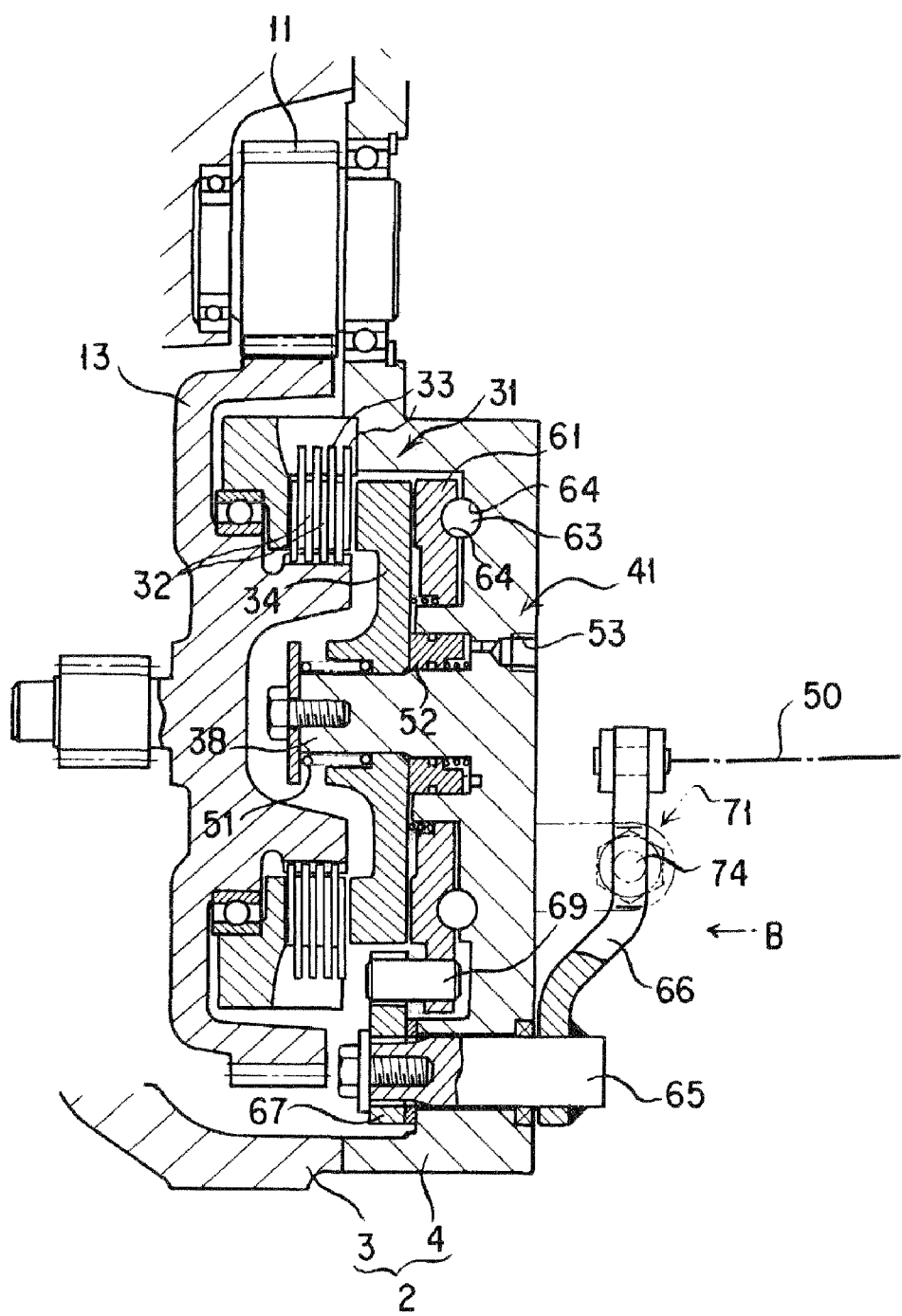
FIG. 14 is an explanatory view illustrating a fourth form of implementation of the drive unit for a battery forklift according to the present invention.

Mention is made a next, fourth form of implementation in which rather than disposing balls 63 between the pressure and ring plates 34 and 61, as shown in FIG. 14 the ring plate 6 and the cover 4 are formed with semi-elliposoidal sloped grooves 64 and each ball 63 is disposed within the these opposed sloped grooves 64. And, the arm 67 fastened to the shaft 65 is not engaged with the pressure plate 34 but with the lower end of the ring plate 61. This allows the ring plate 61 to rotate slightly as the lever 66 is swung and the ball 63 to get out of the opposed sloped grooves 64 as the ring plate 61 rotates slightly, moving the ring plate 61 with respect to the cover 4 so as to enlarge the gap between them and thereby moving the pressure plate 34.

Figure 15:
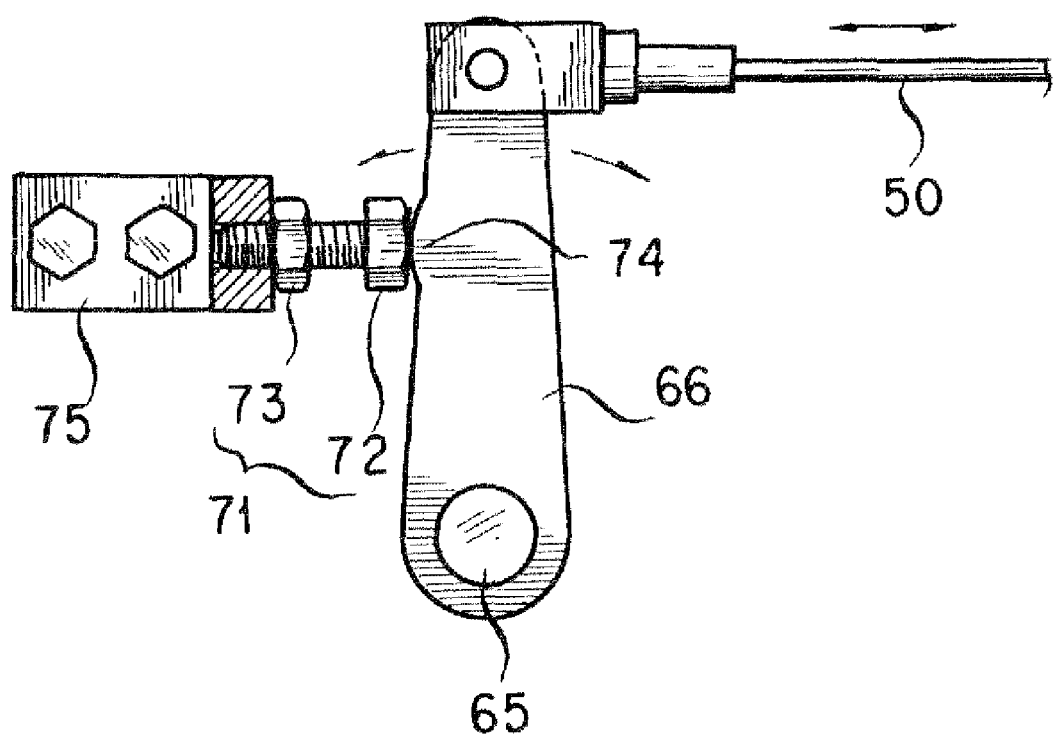
FIG. 15 is a view as seen in the direction of arrow B in FIG. 14.
Figure 16:
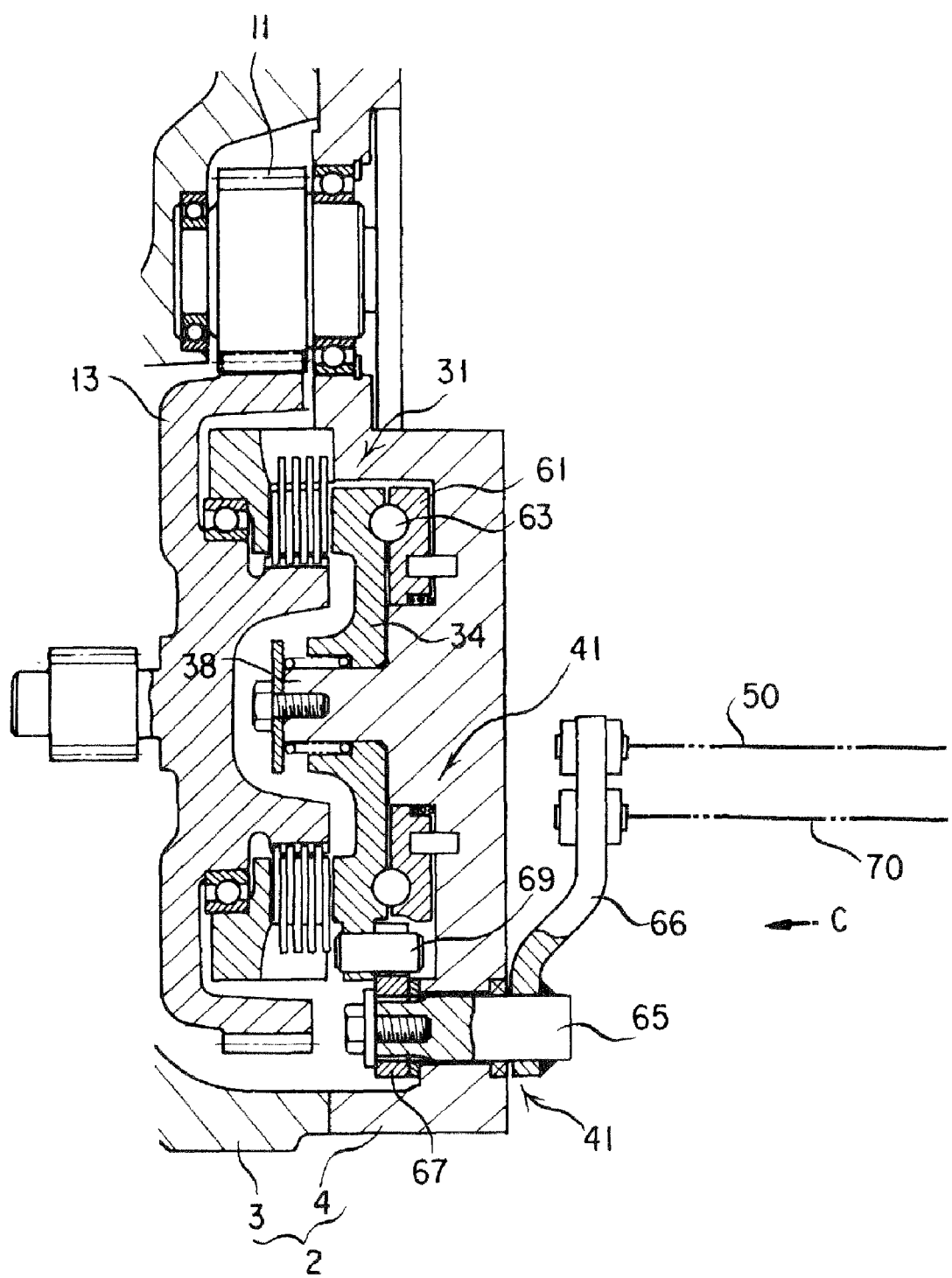
FIG. 16 is an explanatory view illustrating a fifth form of implementation of the drive unit for a battery forklift according to the present invention.
Figure 17:
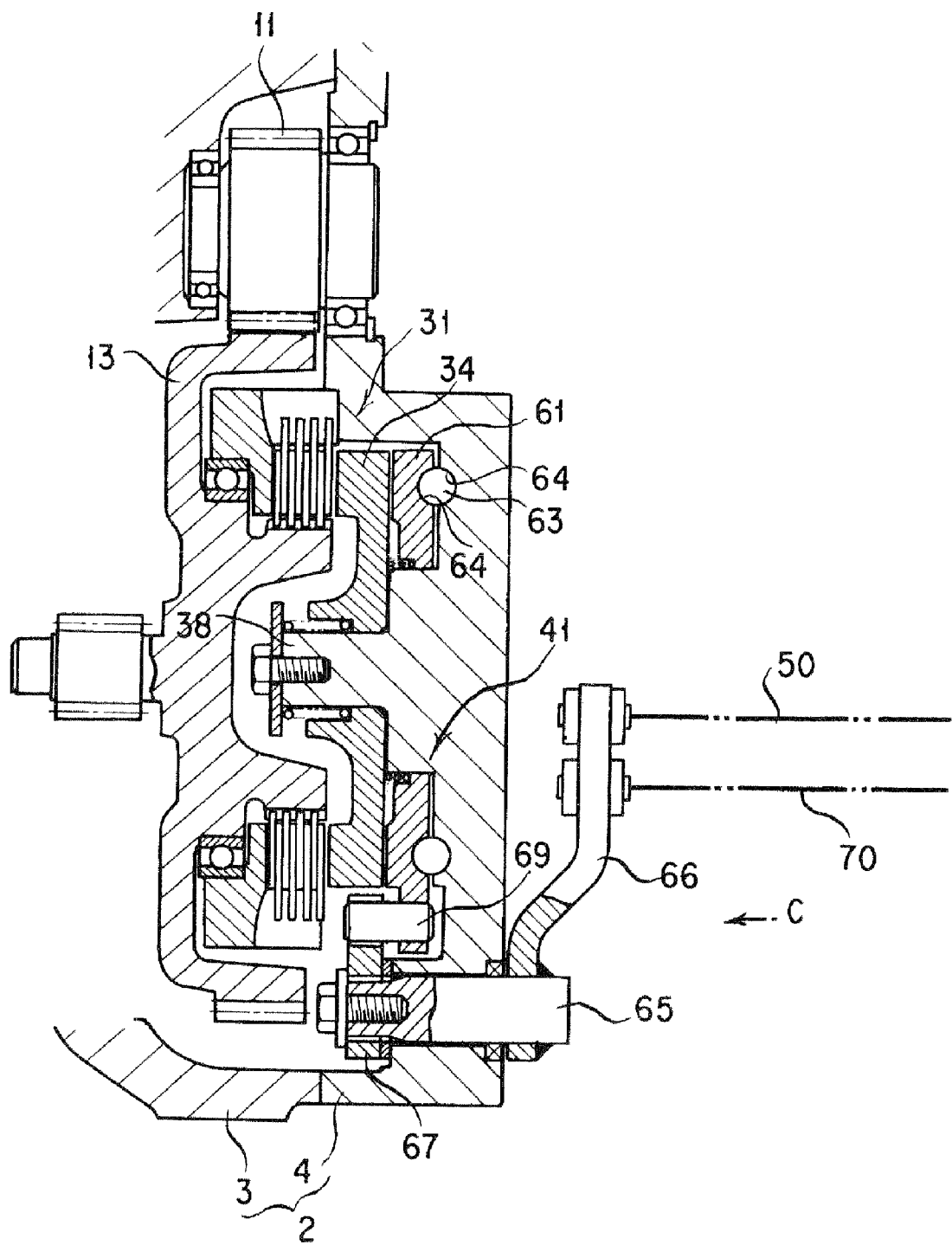
FIG. 17 is an explanatory view illustrating a sixth form of implementation of the drive unit for a battery forklift according to the present invention.

In this forth form of implementation, too, a brake clearance adjuster 71 is provided for adjusting the braking clearance in the inner disk 32 and outer disk 33 in the wet type brake section 31. In the brake clearance adjuster 71 which is of substantially same construction as in the forms of implementation described above, as shown in FIG. 15 the bracket 75 on the side of the vehicle body 1 is provided with the adjusting bolt 72 together with the lock nut 73 while the lever 66 on its side face is formed with the striker 74 in the form of a small protuberance so that the adjusting bolt 72 regulates the swing of the lever 66 to adjust the brake clearance in the wet type brake section 31 to an appropriate value.

Referring next to a fifth and a sixth form of implementation, they basically are generally identical to the third and fourth forms of implementation described above but differ in respect of part of the thrust mechanism 41. That is, while in the third and fourth forms of implementation the fluid passage 53 is formed in the cover 4 for injection and draining of oil or the like based on the operation of the brake pedal, in the fifth and sixth forms of implementation the fluid passage 53 is eliminated. And, instead of eliminating the fluid passage 53, the lever 66 also has a wire 70 coupled thereto so that it may be swung in accordance with the operation of the brake pedal.

Figure 18:
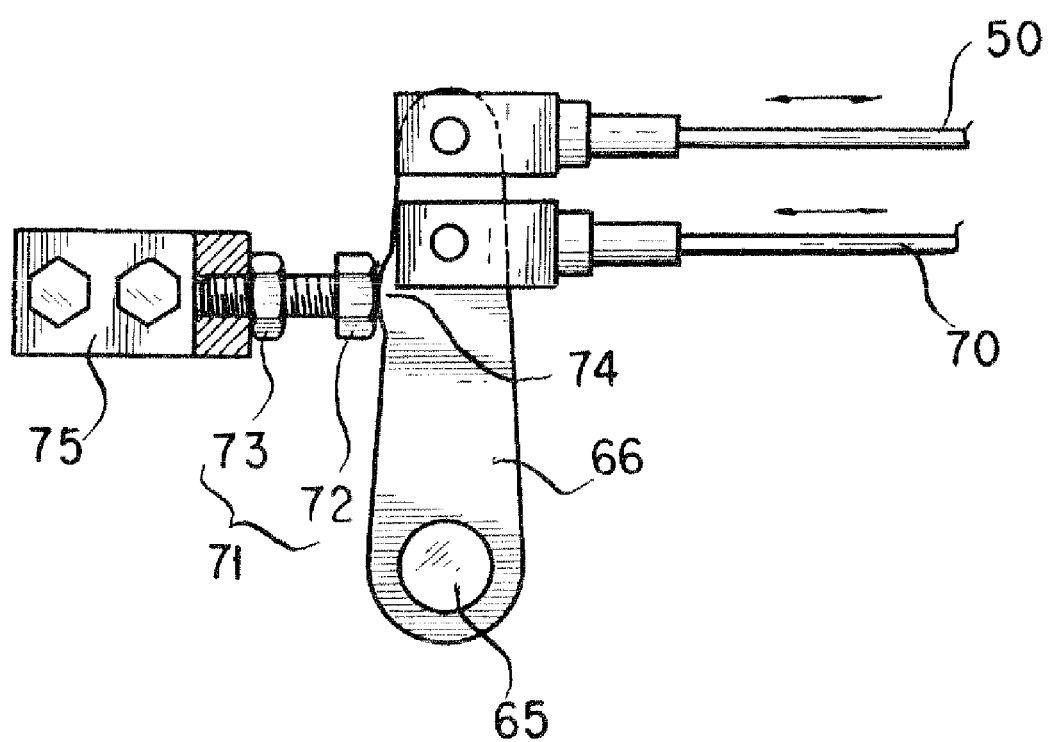
FIG. 18 is a view as seen in the direction of arrow C in FIG. 16 or 17.

Further, in the fifth and sixth forms of implementation, too, a brake clearance adjuster 71 is provided for adjusting the braking clearance in the inner disk 32 and outer disk 33 in the wet type brake section 31. In the brake clearance adjuster 71 which is of substantially same construction as in the forms of implementation described above, as shown in FIG. 18 the bracket 75 on the side of the vehicle body 1 is provided with the adjusting bolt 72 together with the lock nut 73 while the lever 66 on its side face is formed with the striker 74 in the form of a small protuberance so that the adjusting bolt 72 regulates the swing of the lever 66 to adjust the brake clearance in the wet type brake section 31 to an appropriate value.

Thus, a drive unit is provided in which both operations of the brake pedal and the parking brake may be transferred to the single lever 66 in a construction without the fluid passage 53 in the cover 4 so that the pressure plate 34 can be moved by swing of the lever 66 to press the inner and outer disks 32 and 33 whereby various oil hydraulic devices for fluid supply can be dispensed with to make the structure simple and uncomplicated while occurrence of trouble such as failure can be largely eliminated and moreover the drive unit can be lowered in cost to a degree.

What is claimed is:

1. A drive unit for a battery forklift, which is provided in a drive case with a first gear fitted on a motor shaft of a drive motor and a second gear in mesh with the first gear whereby power generated by the drive motor is transmitted via the first and second gears to a carrier,
   wherein the second gear disposed in the drive case is formed inside with a space in which a wet type brake section is disposed,
   said wet type brake section comprising:
      an inner disk whose entire inner periphery is attached to the second gear so as to be rotatable with second gear, the inner disk having a frictional material adhered on its surfaces,
      an outer disk which lies opposite to the inner disk and whose entire outer periphery is attached to a side of the drive case, and
      a pressure plate for pressing together the inner and outer disks lying opposite to each other, and
   wherein the second gear includes a disk mounting section formed on an inner peripheral side, the inner disks being attached to the disk mounting section.

2. A battery forklift drive unit as set forth in claim 1, further comprising a mounting block securely connected to the drive case side, the mounting block inhibiting the outer disk from moving in its radial direction and accepting as a whole a pressing force exerted from the pressure plate and a frictional braking torque generated when the outer and inner disks pressed together by the pressure plate are brought into contact with each other.

3. A battery forklift drive unit as set forth in claim 2, wherein the drive unit includes a thrust mechanism comprising a cylinder block fastened to the drive case side, the cylinder block having therein a piston whose end has a rod fastened thereto in contact with the pressure plate in the wet type brake section and a push rod at a side opposite to that where the piston has the rod whereby when a service brake is operated, said piston is moved by fluid injected via a fluid passage to push the pressure plate via an end of the rod, to bring the outer and inner disks into contact with each other and thereby to generate frictional braking torque between them and when a parking brake is operated, said piston is moved by the push rod pushed via a lever coupled to a wire connecting to a parking lever to push the pressure plate via an end of the rod, to bring the outer and inner disks into contact with each other and thereby to generate frictional braking torque between them.

4. A battery forklift drive unit as set forth in claim 3, wherein the drive unit further comprises a brake clearance adjuster for regulating a swing of the lever to push the push rod in the thrust mechanism to adjust a brake clearance for the inner and outer disks in the wet type brake section.

5. A battery forklift drive unit as set forth in claim 1, wherein the drive unit includes:
   a thrust mechanism whereby when a service brake is operated, the pressure plate is pushed via a ring shaped piston by fluid injected via a fluid passage to push the pressure plate via an end of the rod, to bring the outer and inner disks into contact with each other and thereby to generate frictional braking torque between them and when a parking brake is operated, the pressure plate is pushed, via and by a swing of, a lever coupled to a wire connecting to a parking lever to bring the outer and inner disks into contact with each other and thereby to generate frictional braking torque between them; and
   a brake clearance adjuster for regulating the swing of said lever to adjust a brake clearance for the inner and outer disks in the wet type brake section.

6. A battery forklift drive unit as set forth in claim 1, wherein the drive unit includes:
   a thrust mechanism whereby when a service brake and a parking brake are operated, the pressure plate is pushed, via and by a swing of, a lever coupled to a wire connecting to a parking lever and a wire interlocked with an operating brake pedal to bring the outer and inner disks into contact with each other and thereby to generate frictional braking torque between them; and
   a brake clearance adjuster for regulating the swing of said lever to adjust a brake clearance for the inner and outer disks in the wet type brake section.

7. A battery forklift drive unit as set forth in claim 2, wherein the drive unit includes:
   a thrust mechanism whereby when a service brake is operated, the pressure plate is pushed via a ring shaped piston by fluid injected via a fluid passage to push the pressure plate via an end of the rod, to bring the outer and inner disks into contact with each other and thereby to generate frictional braking torque between them and when a parking brake is operated, the pressure plate is pushed, via and by a swing of, a lever coupled to a wire connecting to a parking lever to bring the outer and inner disks into contact with each other and thereby to generate frictional braking torque between them; and
   a brake clearance adjuster for regulating the swing of said lever to adjust a brake clearance for the inner and outer disks in the wet type brake section.

8. A battery forklift drive unit as set forth in claim 2, wherein the drive unit includes:
   a thrust mechanism whereby when a service brake and a parking brake are operated, the pressure plate is pushed, via and by a swing of, a lever coupled to a wire connecting to a parking lever and a wire interlocked with an operating brake pedal to bring the outer and inner disks into contact with each other and thereby to generate frictional braking torque between them; and
   a brake clearance adjuster for regulating the swing of said lever to adjust a brake clearance for the inner and outer disks in the wet type brake section.

* * * * *